United States Patent [19]
Hanak

[11] Patent Number: 5,858,199
[45] Date of Patent: Jan. 12, 1999

[54] APPARATUS AND METHOD FOR ELECTROCORIOLYSIS THE SEPARATION OF IONIC SUBSTANCES FROM LIQUIDS BY ELECTROMIGRATION AND CORIOLIS FORCE

[75] Inventor: Joseph J. Hanak, Ames, Iowa

[73] Assignee: Apogee Corporation, Ames, Iowa

[21] Appl. No.: 678,892

[22] Filed: Jul. 12, 1996

Related U.S. Application Data

[60] Provisional application No. 60/001,485 Jul. 17, 1995 and provisional application No. 60/009,748 Jan. 11, 1996.

[51] Int. Cl.$^6$ ..................................................... C02F 1/461
[52] U.S. Cl. ......................... 205/687; 205/688; 205/742; 205/702; 205/771; 204/242; 204/267; 204/269; 204/271; 204/272; 204/273; 204/275
[58] Field of Search ..................................... 205/687, 688, 205/742, 702, 771; 204/242, 267, 269, 271, 272, 273, 275

[56] References Cited

U.S. PATENT DOCUMENTS

| | | | |
|---|---|---|---|
| 1,230,524 | 6/1917 | Schwerin . | |
| 1,558,382 | 10/1925 | Marx . | |
| 2,854,393 | 9/1958 | Kollsman | 204/180 |
| 2,854,394 | 9/1958 | Kollsman | 204/180 |
| 3,099,615 | 7/1963 | Kollsman | 204/180 |
| 3,196,095 | 7/1965 | Wadsworth | 204/149 |
| 3,335,079 | 8/1967 | Nellen | 204/301 |
| 3,349,021 | 10/1967 | Brown et al. | 204/180 |
| 3,556,967 | 1/1971 | Anderson | 204/180 |
| 4,008,135 | 2/1977 | Gazda et al. | 204/149 |
| 4,017,390 | 4/1977 | Vicard | 210/42 R |
| 4,141,809 | 2/1979 | Aitchison et al. | 204/180 R |
| 4,203,818 | 5/1980 | Greaves | 204/268 |
| 4,432,849 | 2/1984 | Saito | 204/180 R |
| 4,440,616 | 4/1984 | Houseman | 204/275 |
| 4,623,436 | 11/1986 | Umehara | 204/149 |

(List continued on next page.)

FOREIGN PATENT DOCUMENTS 41 41 345 A1  6/1993  Germany .

OTHER PUBLICATIONS

U. S. Department of Energy, Environmental Restoration and Waste Management Five–Year Plan, Fiscal years 1994–1998, Report No. DOE/S–00097P, vol. 1, Jan. 1993.

U. S. Department of Energy, Office of Technology Development, Fiscal Year 1993, Program Mid–Year Summaries Research, Development, Demonstration, Testing and Evaluation, Oct., 1993.

Gross, D.W. "Treatment Technologies for Hazardous Wastes" Part IV. A review of Alternative Treatment Processes for Metal Bearing Hazardous Waste Streams, Journal of the Air Pollution Control Association, 36(5):603–614 (1986). (ISSN No. 0002–2470.), No Month.

(List continued on next page.)

*Primary Examiner*—Arun S. Phasge
*Attorney, Agent, or Firm*—Zarley, McKee, Thomte, Voorhees, & Sease

[57] ABSTRACT

An apparatus and method for separating and removing ionizable components dissolved in fluids, such as for example, water, by separating said ionizable substances into fractions by the action of electric current and of Coriolis force. Liquid containing ionizable components is continuously fed in and the purified solvent and the solute in a concentrated solution are continuously removed while the liquid is rotated. Compound centrifugal force or Coriolis force causes the concentrated solution to move to a location where it can be effectively and continuously removed as well as causes the depleted liquid to move to a separate location where it also can be effectively and continuously removed. The invention can operate in several modes, the modes being electrolytic and electrostatic. The invention allows for almost universal application to removal of ionizable components and provides a cost effective and energy efficient continuous process to do so.

57 Claims, 15 Drawing Sheets

U.S. PATENT DOCUMENTS

| | | | |
|---|---|---|---|
| 4,726,904 | 2/1988 | Ayers | 210/658 |
| 4,762,597 | 8/1988 | Scott | 204/273 |
| 4,769,119 | 9/1988 | Grundler | 204/149 |
| 4,956,071 | 9/1990 | Giuffrida et al. | 204/301 |
| 5,004,531 | 4/1991 | Tiernan | 204/273 |
| 5,082,541 | 1/1992 | Watson | 204/180.1 |
| 5,094,739 | 3/1992 | Kump | 204/150 |
| 5,154,809 | 10/1992 | Oren et al. | 204/182.4 |
| 5,183,546 | 2/1993 | Oren et al. | 204/290 R |
| 5,288,373 | 2/1994 | Yang | 204/131 |
| 5,384,685 | 1/1995 | Tong et al. | 361/503 |
| 5,425,858 | 6/1995 | Farmer | 204/149 |
| 5,464,453 | 11/1995 | Tong et al. | 29/25.03 |

OTHER PUBLICATIONS

Peters, Robert W. and Ku, Young, in Separation of Heavy Metals and Other Trace Contaminants, Robert W. Peters and B. Mo Kim, eds., Amer. Inst. of Chem. Engineers, Symposium Series 243, vol. 81, p. 165 (1985), No Month.

Freeman, Harry M., Standard Handbook of Hazardous Waste Treatment and Disposal, editor, U. S. Environmental Protection Agency, McGraw–Hill Book Company, New York (1989), No Month.

Evaluation of Management Practices for Mine Solid Waste Storage, Disposal, and Treatment, vol. 2, prepared by PEI Associates, Inc. Cincinnati, OH (formely PEDCo Environmental, Inc.) for the U.S. EPA Office of Research and Development, Cincinnati OH, (1983), No Month.

Brooks, Clyde C., Metal Recovery from Industrial Waste, Lewis Publishers, Inc., Chelsea, MI (1991), No Month.

Aguwa, Aloysius, A. and Charles N. Haas, "Electrolytic Recovery Techniques," in Ref. 3. p. 6.39, No Date.

Pemsler, J. P. and A. S. Rappas, "Metal Recovery from Solutions by Selective Reduction of Metal Ions," pp. 135–158, in Recent Developments in Separation Science, vol. 5, N. N. Li, ed., CRS Press, West Palm Beach, FL, (1979), No Month.

Benirati, C. A. and W.J. McLay, "Electrolytic Metal Recovery Comes of Age," Plating and Surface Finishing, Mar. 1983, p. 26.

Farkas, J., and G. D. Mitchell, in Separation of Heavy Metals and Other Trace Contaminants, Robert W. Peters and B. Mo Kim, eds., Amer. Inst. of Chem. Engineers, Symposium Series 243 in Ref. 17, p. 57, No Date.

Campbell, M. E. and W. M. Glenn, A Guide to Industrial Waste Reduction and Recycling, Pollution Probe Foundation, Toronto, Canada (1982), No Month.

U. S. Environmental Protection Agency, Development Document for Existing Sourced Pretreatment Standards for the Electroplating Point Source Category, EPA 440/1–79/003, Washington, D.C. Aug. 1979, 204.

Robertson, P. M. J. Leudolph, and H. Maurer, "Improvements in Rinsewater Treatment by Electrolysis," in Plating and Surface Finishing, Oct. 1983, p. 521.

Bier, Milan, Electrophoresis: Theory, Methods and Applications, Academic Press (1967), No Month.

Frilette, Vincent, J., J. Phys. Chem. 61, 168–174 (1957), No Month.

Murphy, George W., J. Electrochem. Soc. 97, 405–413 (1950), No Month.

Shaffer, L. H. and M. S. Mintz, in Principles of Desalination, Second Edition, Part A, K. S. Spiegler and A. D. K. Laird, Editors, Academic Press, 263–354 (1980), No Month.

P. M. Wild and G. W. Vickers, "The Technical and Economic Benefits of Centrifugal Reverse Osmosis Desalination" Desalination 89, 33–40 (1992), No Month.

Y. Oren and A Soffer, "Electrochemical Parametric Pumping," J. Electrochem. Soc.: Electrochemical Science and Technology 125, 869–875 (1978), No Month.

Y. Oren and A. Soffer, "Water desalting by means of electrochemical parametric pumping. I. The equilibrium properties of a batch unit cell," Journal of Applied Electrochemistry 13, 473–487 (1983).

Y. Oren A. Soffer, "Water desalting by means of electrochemical parametric pumping. II. Separation properties of a multistage column,", Journal of Applied Electrochemistry 13, 489–505 (1983), No Month.

"SDI 'Supercapacitors' to See Civilian Applications," edited by P. Hamilton, Science 255, 787, Feb. 1992.

Conway, B. E., "Transition from 'Supercapacitor' to 'Battery' Behavior in Electrochemical Energy Storage," J. Electrochem. Soc. 138, No. 6, 1539 (1991). No Month.

Koresh J. and A. Soffer, Double Layer Capacitance and Charging Rate of Ultramicroporous Carbon electrodes, ibid., 124, No. 9, 1379 (1977), No Month.

Tanahashi Ichiro, A. Yoshida and A. Nishino, "Electrochemical Characterization of Activated Carbon–Fiber Cloth Polarizable Electrodes for Electric Double–Layer Capacitors," ibid., No. 10, 3052 (1990).34, No Month.

Gagnon, E. G. "The Triangular Voltage Sweep Method for Determining Double–Layer Capacity of Porous Electrodes," ibid., 122, No. 4, 521 (1975), No Month.

"Laboratory Deionization Technology May Herald Low Cost Sea Water Desalination and Waste Water Treatment," News Release, Lawrence Livermore National Laboratory, Dec. 20, 1994.

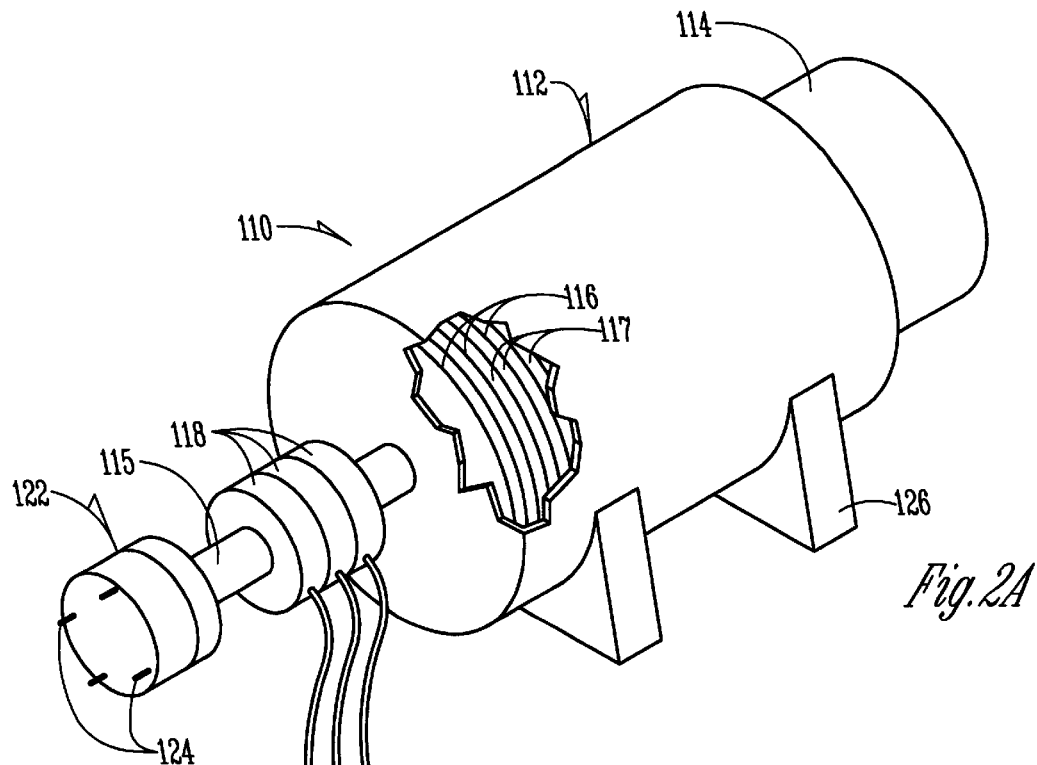
*Fig.2A*
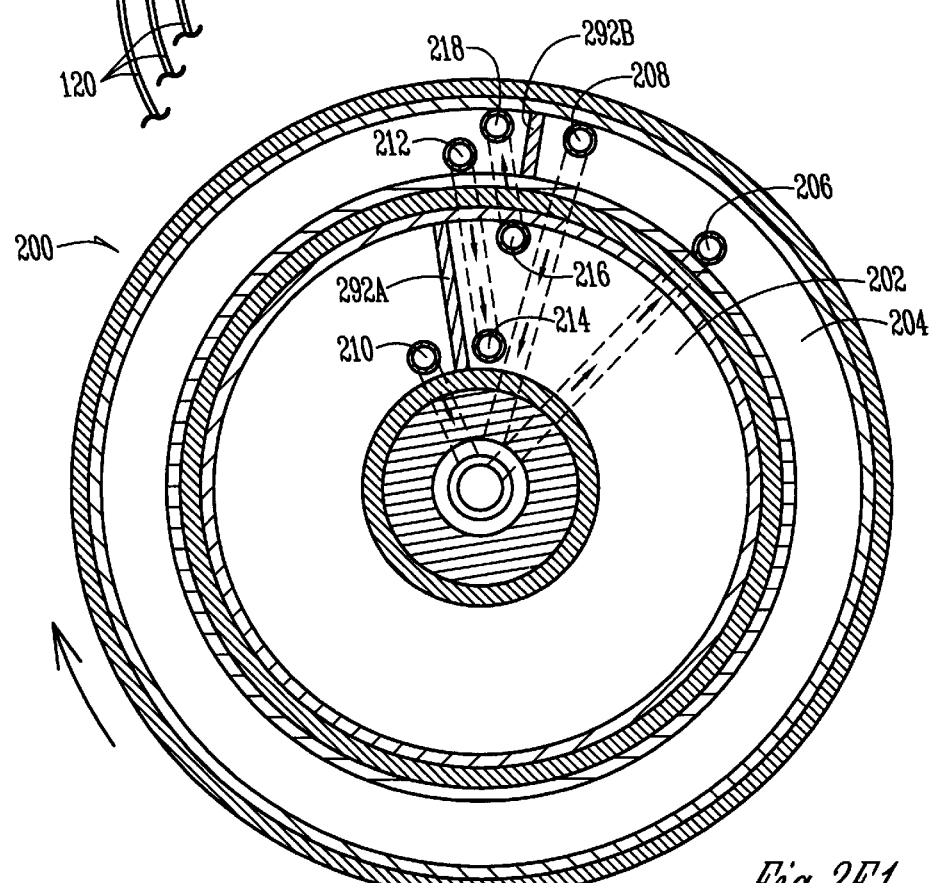
*Fig.2E1*

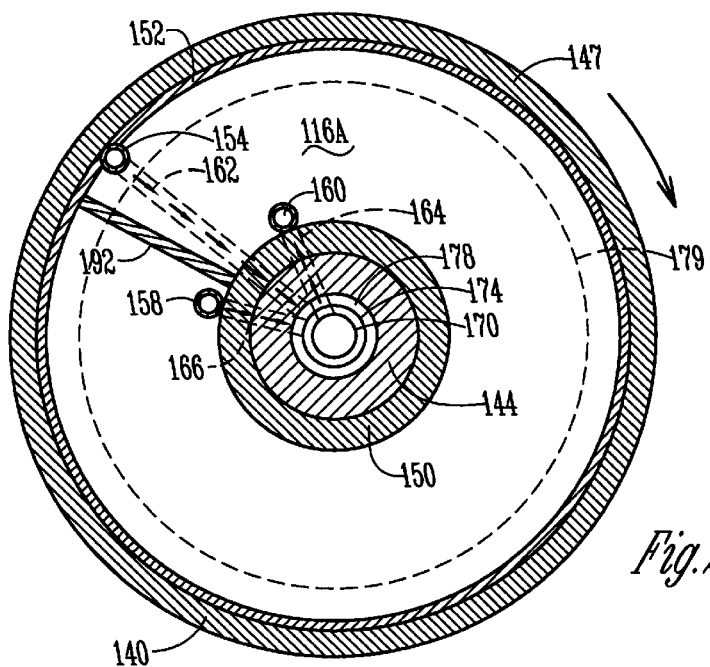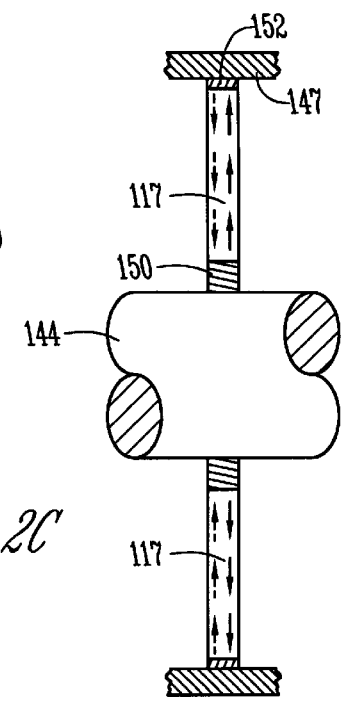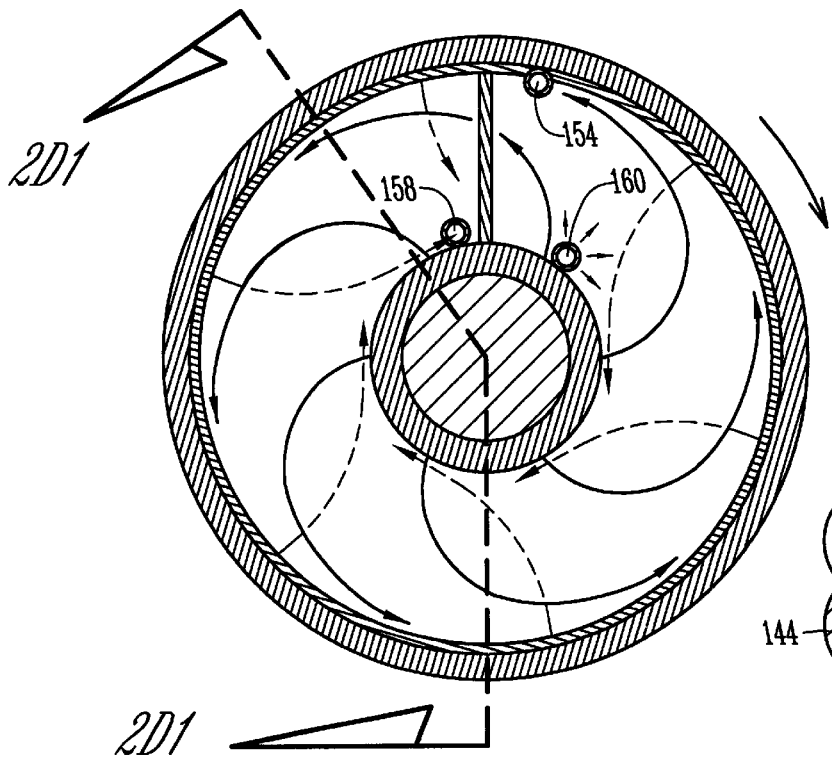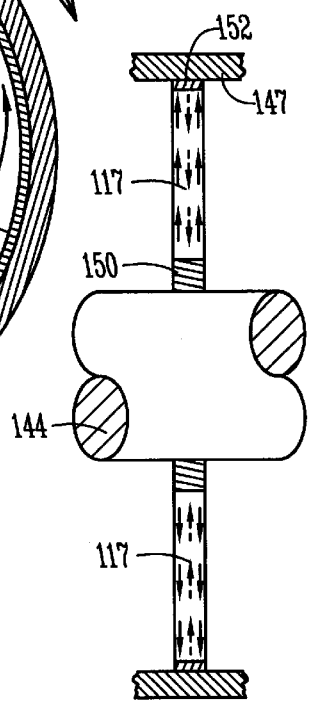

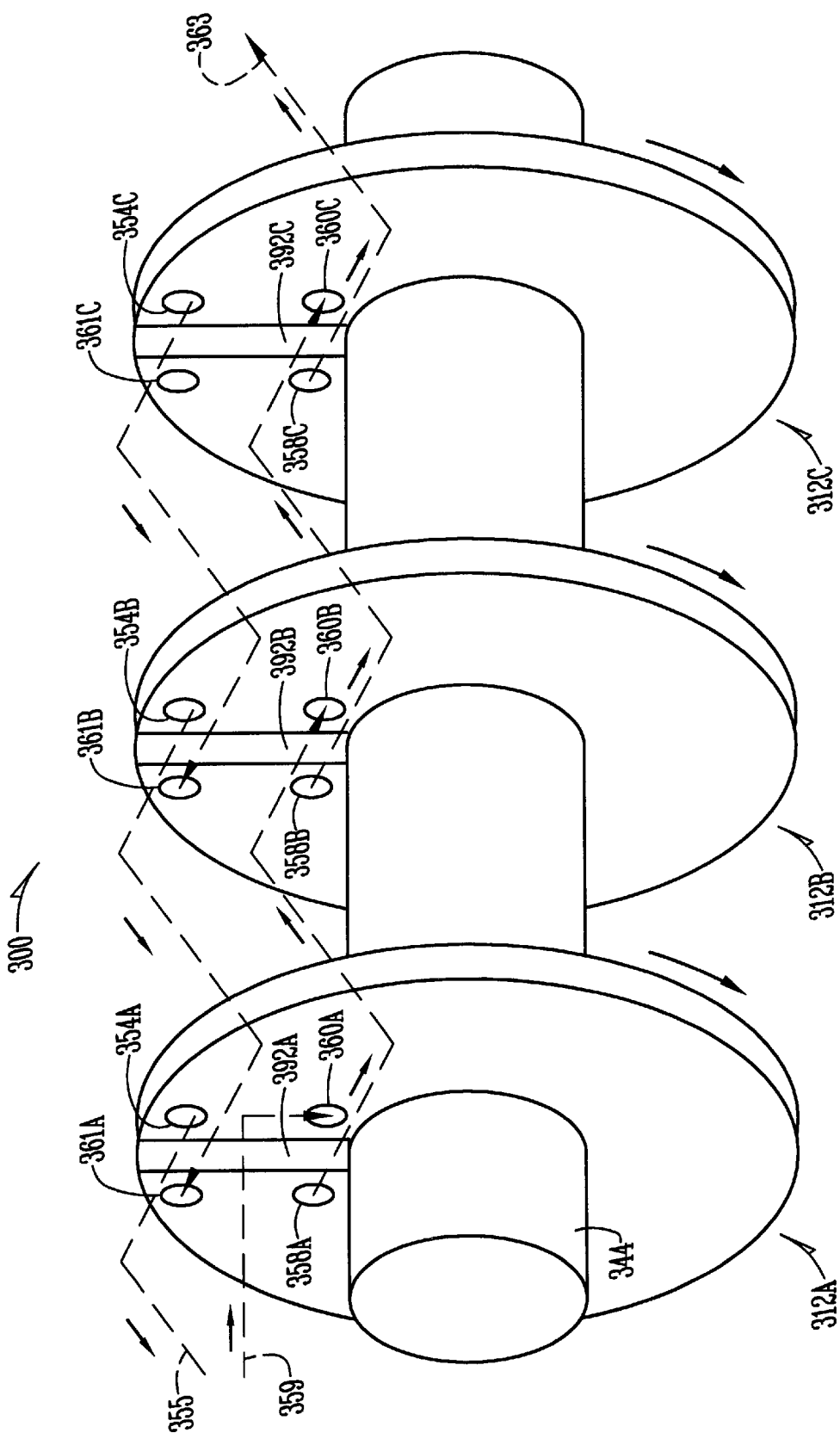
Fig. 2E2

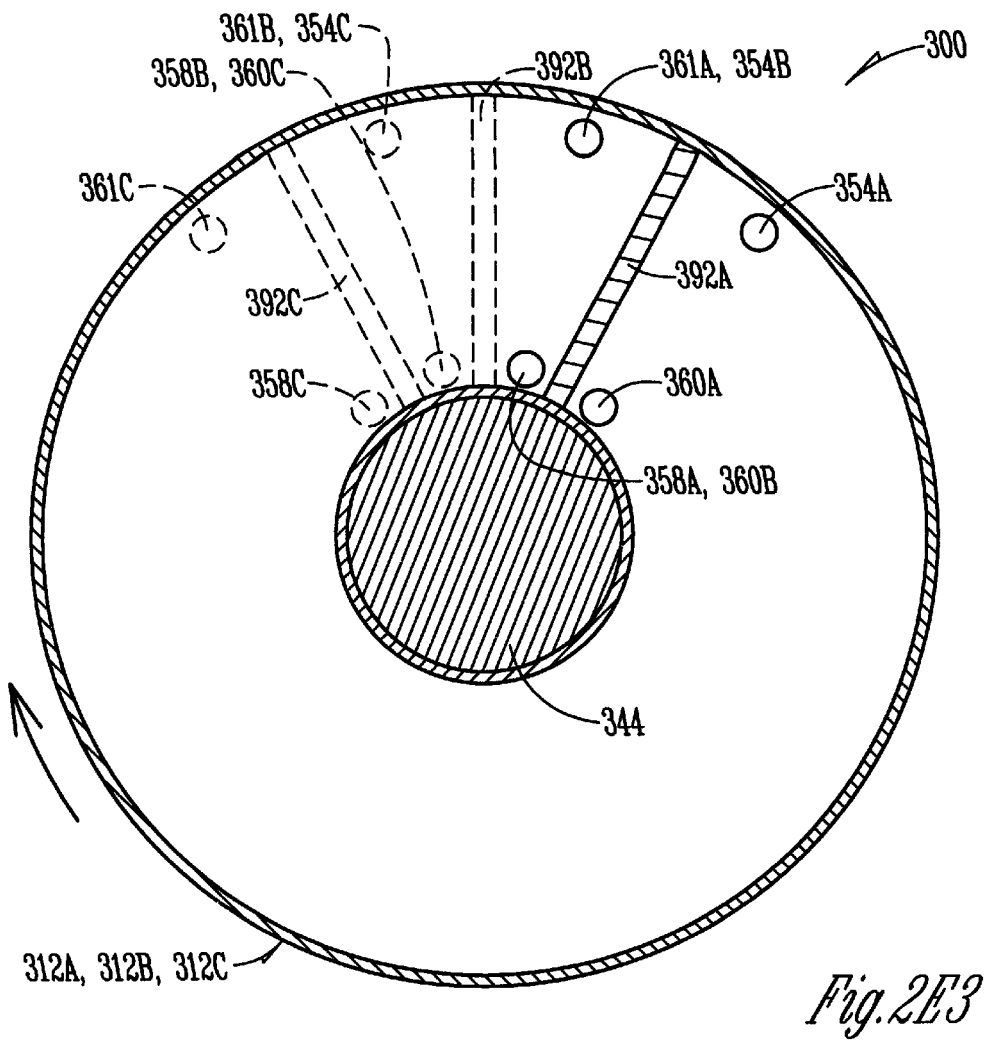
Fig.2E3

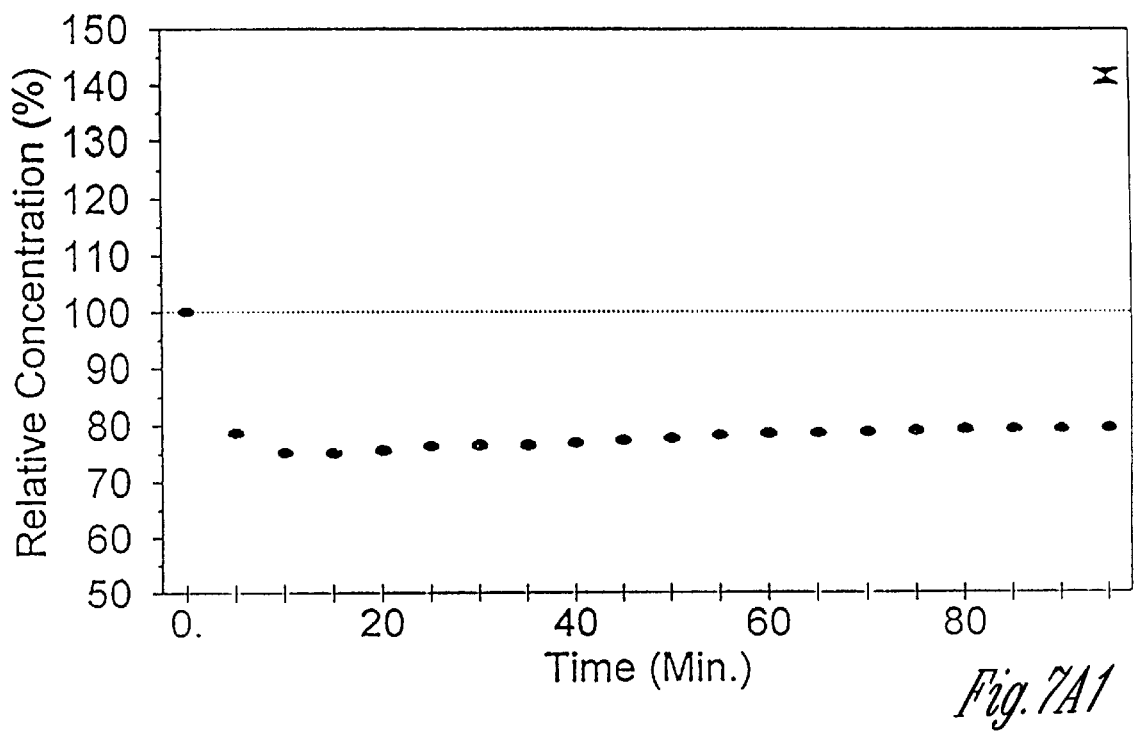
Fig. 7A1
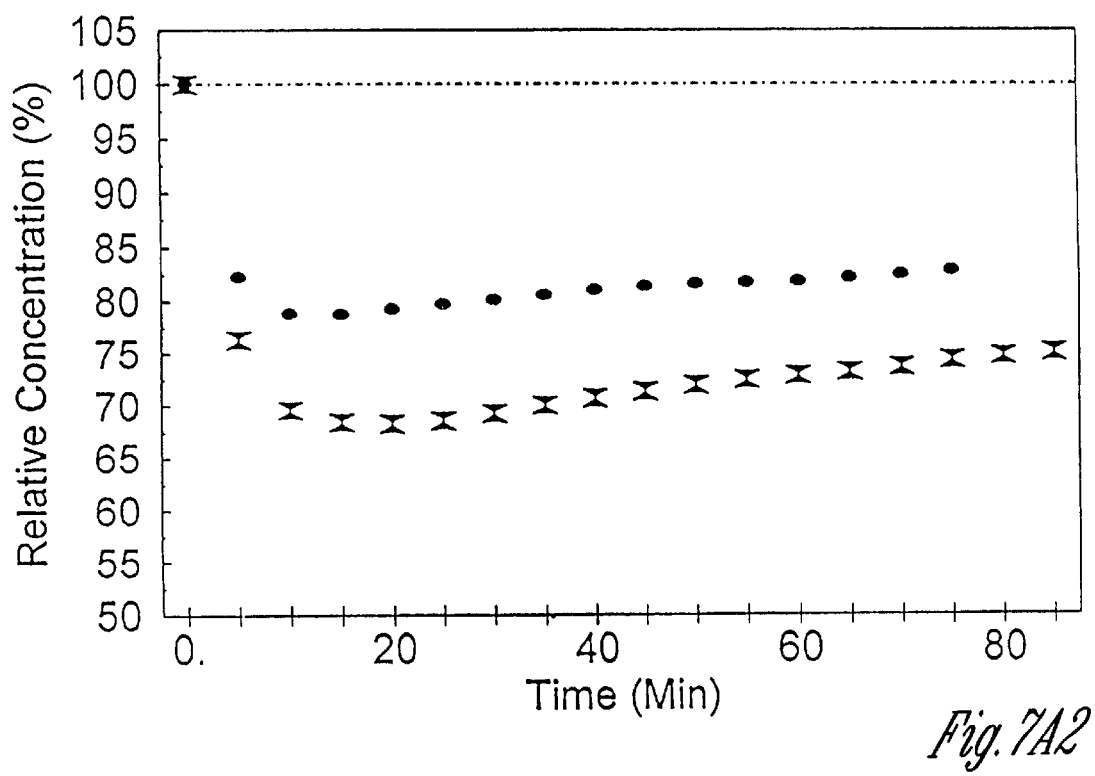
Fig. 7A2

5,858,199

APPARATUS AND METHOD FOR ELECTROCORIOLYSIS THE SEPARATION OF IONIC SUBSTANCES FROM LIQUIDS BY ELECTROMIGRATION AND CORIOLIS FORCE

FIELD OF THE INVENTION

This application claims the benefit of U.S. Provisional Application Ser. No.: 60/001,485 filed Jul. 17, 1995 and Ser. No. 60/009,748 filed Jan 11, 1996.

This invention relates generally to an improved device and method for separating and removing ionizable components dissolved in fluids, such as for example, water. More particularly, this invention relates to separating said ionizable substances into fractions by the action of electric current and of Coriolis force. Still more particularly, the invention relates to a rotary device and a process in which a liquid containing ionizable components is continuously fed in and the purified solvent and the solute in a concentrated solution are continuously removed. Most particularly, the invention relates to a rotary device and a process in which said ionizable substances are separated in one of two modes, the modes being electrolytic and electrostatic.

BACKGROUND OF THE INVENTION

Only about three percent of all the water on the globe is fresh water. With expanding population there is increasing competition for fresh water and in many areas of the world there is a growing dependence on water purified by various means. Commercial methods used for water demineralization of brackish and sea water include reverse osmosis, electrodialysis and several different distillation methods. Plants processing up to 45 million gallons per day (MGD) are in use to produce drinking water from sea or brackish waters at a cost ranging from $1.31 to $1.75 per cubic meter for the largest plants.

In addition to being overused, existing fresh water resources are also subject to contamination by industry, mining and urban sewage. Billions of gallons of metal-bearing and cyanide-bearing wastes are generated annually by U.S. industry. Vast volumes of water contaminated with heavy metals have accumulated at such sites as abandoned mines. Typical metal contaminants include lead, zinc, iron, and copper at levels ranging from 1000 to 10000 parts per million (PPM) by weight. Other contaminants may include gold, silver, platinum, and molybdenum, with lesser quantities of manganese, nickel, arsenic, barium, cadmium and chromium. Inorganic contamination consists mainly of cyanide, sulfate, nitrate and fluoride. More than 3000 contaminated sites have been identified at U.S. Department of Energy (DOE) facilities located across the Nation [Ref. 1]. At these sites the soil and groundwater are contaminated with hazardous and radioactive chemicals, which include numerous organic substances, heavy metals and radionuclides from the nuclear industry, including uranium, plutonium, cesium ($^{137}$Cs), strontium ($^{90}$Sr), technetium ($^{99}$Tc) and tritium ($^3$H).

Legislation has been enacted to clean up these sites and to prevent the generation of new wastes. Two basic waste management approaches have been taken; one is waste disposal and the other waste reduction and resource recovery by means of appropriate waste treatment processes. Because of the magnitude of the problem and its estimated cost of about $1 trillion by the year of 2000, numerous waste treatment technologies have evolved. In its effort to identify applicable processes the U.S. Department of Energy (DOE) [Ref. 2] has recently evaluated 55 such technologies and recognized the following 24 general types: adsorption, bioadsorption, chelation chromatography, coagulation, flocculation, distillation, evaporation, froth flotation, gas hydrate formation, neutralization, reverse osmosis, ultracentrifugation, anaerobic trickling filtration, biological reduction, chemical precipitation, sedimentation, dilution, electrochemical and electrokinetic methods, filtration, freeze crystallization, ion exchange, oxidation, solvent extraction, and ultrafiltration. From these technologies and those yet to be developed, a few may be selected as possibly cost-effective to deal with the cleanup problem. Description of numerous processes used for the recovery of heavy metals appears in the literature [Ref. 2, 3, 4, 5, 6].

The process of this invention falls into the electrochemical and electrokinetic category along with electrodialysis and the electrolytic recovery processes, which are briefly summarized next. Extensive evaluation of the electrolytic processes appears in three recent review articles [Ref. 4, 7, 8]. One of these cited 136 publications for this type of separation process. Generally, in electrolytic recovery metal is plated onto the cathodes from which it is subsequently stripped off and recovered in a batch operation. The process is also amenable for isolation of components from complex mixtures by selective reduction of metal ions [Ref. 9]. The metals which have been recovered by electrolytic methods include at least Ag, Au, Cd, Co, Cr, Cu, Ni, Pb, Pd, Pt, Sn and Zn. One of the most common applications is the recovery of copper from sulfuric acid solutions [Ref. 10].

Waste systems in which metal concentrations approach one weight percent can be handled with conventional commercial electrodeposition apparatus. Very low metal concentrations pose a problem with metal recovery because of the formation of a polarized layer around the cathode, which leads to a low rate of diffusion of ions into and across the layer, low deposition rate and limiting extraction of the metal from the water. This problem has been addressed effectively by the use of "high surface area" (HSA) electrodes made of carbon-fiber mats [Ref. 11] or of porous metallic electrodes. The carbon-fiber electrode has a surface area which can be about 12,000 times greater than the apparent area, leading to an enhancement of the mass transfer by several orders of magnitude. A depletion of the metal from the solution to levels less than 1 mg/L has been achieved for silver, which satisfies the EPA requirements. A similar system has been used to recover up to 99.9% of cadmium from waste solutions [Ref. 12]. The HSA system is most effective at concentrations of less than 10 mg/L [Ref. 13, 14]. The HSA system is also used effectively to destroy cyanide by anode oxidation [Ref. 12].

The instant invention is more closely related to prior art which teaches a means of separation of ionizable constituents from liquid solutions by the action of electric current and the earth's gravity. One of the processes is known as electrodecantation, in which colloidal substances are separated from ionic solutions [Ref. 15]. Electrodecantation was for a time a commercial process for separating rubber latex and certain biological components. A variation of this process, known as electrogravitation (EG), has been reported for the separation of ionic substances from aqueous solutions. Two types of apparatus have been described, one by Frilette [Ref. 16] and the other by Murphy [Ref. 17]. In the first type, described by Frilette, an electrodialysis cell was used, having vertically disposed end electrodes, with two or more, spaced-apart semi-permeable, parallel membranes in between. The separation of the solute occurs in two steps. The first step is the electrodialysis process achieved by electromigration, whereby enhancement and depletion of the original solution take place in-between alternate pairs of membranes. The second step, taking place under the action of gravitational force, is the separation of the concentrated solution from the depleted solution, which collect at the bottom and the top of the cell, respectively. Frilette [Ref. 16] demonstrated desalination of 0.1N NaCl solution in a cell using synthetic ion exchange membranes. His results and additional data by Kollsman [Ref. 18] indicate that a partial desalination can be achieved by this technique. Typical brackish waters of 2000–3000 PPM were demineralized to less than 500 PPM. A number of patents appeared on the subject [Ref. 18, 19, 20]. Kollsman [Ref. 18] has also shown that the symmetry of electrogravitational cell performance with membranes permits electrical reversal with no change in external hydraulics, which means that the low-density desalted product water will always rise to the top while the dense, concentrated solution will fall to the bottom of the cells.

In the second type of EG apparatus, described by Murphy [Ref. 17] an electrolytic cell was used consisting of a cylindrical cell having vertically-disposed, concentric, cylindrical, reversible electrodes of Ag/AgCl, without membranes. He used long (minutes) dc current pulses of alternating polarity for the electrogravitation process. With the Ag/AgCl electrodes, the Cl$^-$ ion is released at the cathode, while the Na$^+$ ion migrates towards it. In this manner a concentrated solution is formed near the cathode, which then sinks downward. At the anode the Cl$^-$ ions are depleted by the formation of AgCl, while the Na$^+$ ions are depleted by the migration toward the cathode. In this manner a depleted solution is formed near the anode, which rises to the top. The combined opposite motion of the two liquids results in convection which is essential to the EG process. Thus, the EG process operates in conjunction with either electrolysis or electrodialysis. In the said prior art of the second kind which employs reversible Ag/AgCl electrodes, only those aqueous solutions containing the chloride ion as the anion have been successfully separated by the prior art. They included the salts KCl, NaCl and hydrochloric acid, HCl. This prior art does not teach the separation of other anionic species, nor does it teach the separation of cations. However, separation of the latter is of particular interest as in the case of hazardous wastes containing heavy metals and nuclear wastes. The same prior art [Ref. 17] also fails to teach separation of the solute at concentrations of less than several hundred PPM, nor scaling to high capacity nor increasing the efficiency of the process.

Electrogravitation never became a commercial process, probably because it operated at a slow rate and because it was not effective at low concentrations of the solute of less than about 200 PPM [Ref. 21].

Separating constituents of a solution into fractions under the influence of an electric current and centrifugal force by means of a electrodialysis apparatus has been proposed by Kollsman [Ref. 18] but never demonstrated. Kollsman apparently failed to foresee the potential of major improvements in the process that can be brought about by the use of the centrifugal force, nor did he teach the design of the required apparatus.

Other prior art includes application of centrifugal force to augment the separation of sewage sludge and simultaneous separation of platable metals by electrolysis as proposed in a German patent by H. Reimann [Ref. 22]. In this proposed process a rotating device is used consisting of an external cylinder container which also acts as a cathode, and an internal concentric cylindrical post which is the anode. Sewage sludge is fed from the top end of the concentric device which has its axis positioned vertically. The sludge is collected on the cathode walls, while the metals are to be plated on the anode post, which is contrary to the electroplating practice and which appears to be incorrect. It also appears that in this equipment the centrifugal force would hinder rather than assist the removal of the heavy metals from the solution. Moreover, there is no provision for a continuous process; once a substantial layer of heavy metal would build up on the center post electrode, the process would have to be interrupted and the electrode would have to be replaced. Furthermore, this equipment is not suited for polarity reversal which is highly desirable for the continuous operation.

In a process named "centrifugal reverse osmosis desalination" [Ref. 23] centrifuigal force is used to advantage in reducing the high pressure pump requirements. The reference stated that a 3000 gallon per day prototype of this process was undergoing tests on a Canadian Navy vessel.

There exists prior art that combines the action of electrical field and centrifugal forces in the separation process. U.S. Pat. No. 1,230,524 issued to Schwerin [Ref. 24] describes a method of separating substances in suspension in a liquid, comprising adding a suitable electrolyte to the liquid and subjecting the liquid and the substance in sol-state (a colloidal suspension of a solid in a liquid) therein to the simultaneous action of centrifugal force and an electric current. The electrodes in this apparatus are disposed concentrically.

U.S. Pat. No. 1,558,382 issued to Marx [Ref. 25] discloses a process for an electrocentrifugal separation of liquid or solid particles from liquids comprising simultaneous utilization of an electric field and centrifugal force in a centrifuge equipped with rotating concentric cylindrical electrodes. In the separation of colloidal suspension the particles having density greater than the fluid will impinge on the inner wall of the outer electrode and the less dense particles on the outer wall of the inner electrode. No provision is made for a continuous removal of the solids needed for a continuous operation.

U.S. Pat. No. 3,556,967 issued to Anderson [Ref. 26] discloses a method and apparatus for separating macromolecular substances by electrophoresis in a liquid gradient while it is being stabilized in a centrifugal field. This apparatus or method are clearly not applicable for a continuous demineralization of aqueous solutions.

U.S. Pat. No. 4,008,135 issued to Gazda [Ref. 27] discloses a method of deionizing a solution in an ultracentrifuge device also under the action of combined electric field and centrifugal force. Under the action of high centrifugal field, vaporization of the liquid takes place which facilitates the separation of the ions. In addition, electrolysis of the sodium chloride is said to take place with the formation of sodium hydroxide and chlorine. Reduction to practice in the form of desalination of a salt solution was described. However, the requirement of an ultracentrifuge precludes low-cost operation as well as purification of water on a large, commercial scale. Moreover, the vaporization of water and the electrolysis of salt are energy-intensive processes which would result in a high operational cost.

Prior art that is pertinent to the present invention is U.S. Pat. No. 3,196,095 issued to Wadsworth [Ref. 28]. He discloses a method of purifying liquids by removal of solids in solution and particularly converting sea water to fresh water. This method comprises electrochemically concentrating solids in a portion of the liquid, leaving the rest of the liquid relatively free of the solids, and separating the concentrated portions from free portions by the action of centrifugal force. Wadsworth discusses removal of ions from fluid, giving as an example desalination of water, without providing any details or reduction to practice. Wadsworth also teaches continuous removal of ions that have been separated from the feed fluid.

While what he called an electrocentrifugal separation process is described in Wadsworth's patent, the design of the apparatus disclosed reveals serious flaws and deficiencies that would pre-empt any claimed effectiveness in the separation of dissolved solids from liquid solutions. A discussion of these deficiencies and their rectification by means of the instant invention is discussed later.

Other prior art, not involving either gravitational or centrifulgal forces is "electrochemical parametric pumping," described by Oren and Soffer [Ref. 29a, 29b, 29c]. In this process ionic species, positive and negative are attracted to highly porous carbon electrodes via a double-layer capacitive process. By sequential charging, forward pumping, discharging, and reverse pumping, this process has been shown capable of high degree of separation of aqueous NaCl solutions at starting concentrations of 0.01 normal. The effluent in Oren and Soffer during charging is the diluent. During discharging the effluent is the concentrate.

Desalination by capacitive deionization has been reported involving the use of HSA aerogel electrodes [Ref. 35, 36]. The apparatus and method is described in detail by Farmer in [Ref. 36]. Neither involves the use of gravitational, centrifugal or Coriolis forces. Farmer's apparatus and method are similar to prior art described by Oren and Soffer in [Ref. 29a, 29b, 29c], referred to as 'Electrochemical Parametric Pumping (EPP)'. The difference in Farmer's device is that he employs a a plurality of cells or stages, whereas Oren and Soffer used a single stage. However, Oren and Soffer expressly anticipated a multistage device for practical use.

The U.S. patent to Farmer, U.S. Pat. No. 5,425,858, discloses an apparatus that has cells connected electrically in parallel and intentionally directs fluid through the cells in a serpentine manner, which is a fluid flow in series between cells. The outflow for each stage is the feed for the subsequent stage. The concentrate is collected or rejected in each stage. Farmer also needs two systems in parallel to operate in any fashion of continuous operation. Farmer also uses constant voltage operation, and like Oren and Soffer mentioned above, the effluent during charging is the diluent, but during discharging is the concentrate. Farmer also employs low voltage at a high current.

Electromigration, which together with electrode processes is utilized in several of the deionization processes cited, as well as in the instant invention, is the transport of the dissolved ions through the liquid under the influence of applied electric fields, for the purpose of accumulating the ions at the electrodes of opposite polarity.

One means of accumulating them utilizes electrodialysis, described in Ref. 16 and 18. Another means is for the ions to undergo electrochemical changes such as oxidation or reduction, or simply, electrolysis. Still another way is to accumulate them by means of "double-layer" capacitive charging. The latter two means of accumulation are operative in the two different modes of deionization to be described further on, namely, the electrolytic mode and the electrostatic mode.

Gravitational and the centrifugal forces are utilized in several of the cited prior art as a means of separating the ionic species accumulated by electromigration from the depleted or purified liquid. In the instant invention centrifugal force along with Coriolis force are operative in the separation process. A brief discussion about these forces follows.

Gravitational force is referred to as the average force of earth's gravity on earth's surface. Gravity is commonly measured in terms of acceleration that the force imparts to an object on earth. The generally accepted average international value for acceleration due to gravity is $980.665 \text{ cm·s}^{-2}$ (in English system, $32.17 \text{ ft·s}^{-2}$). In the present description this value is also referred to as 1 G.

Centrifugal force is an apparent force associated with an object moving on a curved path, such as a ball on a string. The force that constrains the ball to move on the circular path is referred to as centripetal force, while the force that pulls on the string in an outward direction is centrifugal force. In this discussion centrifuigal force will also signify the force existing at any point at rest with the rotating system.

Coriolis force, also known as compound centrifugal force, and also as Coriolis acceleration, is additional force or acceleration acting on the motion of bodies in a rotating system. Thus, objects not at rest with the rotating system are subject to Coriolis force.

Wadsworth disclosed the use of electrodes preferably in the form of series of pairs of proximate conical sheet members or plates arranged co-axially. Under the combined action of electric field and centrifugal force, the concentrated, denser portion of the fluid is predicted by Wadsworth to flow along the radially inner wall of the conical electrode toward the periphery, while the depleted fluid is to flow on the radially outer wall of the opposite electrode toward the center. This situation may be possible in the case of an electrolytic mode and only at a constant d.c. polarity which Wadsworth teaches. Under periodically changing polarity, the concentrated, denser fluid would be formed also on the radially outer surface of the conical electrode. At this location the denser liquid would not flow along the electrode surface toward the periphery, but instead would traverse the space between the electrodes toward the opposite electrode, thereby becoming thoroughly mixed with the feed liquid and the depleted liquid. A similar situation would exist in the case of capacitive mode of operation where, as will be seen, dense liquids are formed on both electrode surfaces. The result of this shortcoming would be the absence of or very impaired desalination. It is to be noted that this problem would have surfaced had Wadsworth made an attempt to reduce his invention to practice. The present invention discloses an improved apparatus and method wherein such problems are circumvented as supported by specific examples.

The next deficiency in Wadsworth's patent is the crossover of the feed liquid and the concentrated liquid at the outer periphery of the conical electrodes, which causes further intermixing of concentrated and partially depleted fluids.

Another shortcoming of Wadsworth is the failure to constrain the fluids in between the electrodes from rotational motion. Such motion in fact takes place on account of the Coriolis force, which Wadsworth failed to take into consideration. Allowing the fluid to freely rotate also gives rise to further intermixing of concentrated, depleted and feed fluids. Wadsworth's patent also specifies that the feed liquid should flow from the bottom in between the electrode spacings weaving first toward the periphery, then toward the center and so on. In this manner, the Coriolis force would tend to accelerate the liquid in the forward direction when moving toward the center, then decelerate when moving toward the periphery, thereby causing still further mixing. The present invention not only constrains the fluids from free rotation but also takes advantage of the Coriolis force vector for optimum placement of the feed intake port, and the concentrate and the diluent and exhaust ports.

Still another weakness of the Wadsworth patent is that it specifies the use of continuous dc or pulsed dc current, apparently of the same polarity. This mode of operation would pre-empt the process from becoming continuous.

The present invention also specifically improves over prior art such as Oren and Soffer and the U.S. Farmer patent. Cells are connected in series but fluid flow is in parallel. Operation is continuous, without the need of a second system in parallel. Stages can be added radially or axially. Electrical connection between stages is preferably in parallel. Power input is high voltage and low current, which is more practical and cost effective.

Therefore, there is a real need in the art for improvements regarding separation of ionic substances from liquids. Waste-water treatment is a highly competitive field in which technological and cost advantages of a given process decide its success. The innovative features of this invention can be identified from the objects of this invention which include:

An improved apparatus and method for the separation of a variety of ionizable substances from liquid solutions, including but not limited to minerals, heavy metals, radioactive nuclides, and a variety of anions dissolved in water.

An apparatus and method employing Coriolis force to maximize the rate of separation, the current and energy efficiency, and the level of purity of the treated liquid, such as water.

An apparatus and method for separating components in a dynamic mode in which the process liquid is fed in and the depleted liquid and a concentrate flow out. This mode is suited for processing larger amounts of liquid, such as very large volumes needed for water desalination or the treatment of water wastes, such as surface mine water. Consequently, one of the objects of the invention for the dynamic mode is a capacity of water treatment of up to, but not limited to 1.5 million gallons per day (MGD) for a single mobile or transportable unit.

A membraneless apparatus and process for the separation of a variety of ionizable substances, assisted by Coriolis force, to eliminate problems with fouling, downtime and additional expense.

A continuous process, as opposed to a batch process to achieve cost-effective operation.

Recovery of water of adequate purity for reuse, as for irrigation.

Ability to concentrate the solute in a liquid form to facilitate recovery of valuable components or the disposal of hazardous substances.

Process scalability for large-scale applications such as mine waste-water treatment.

A system capable of being incorporated into fixed or mobile units for ex-situ surface waste-water treatment.

These and other objectives, features, and advantages of the present invention will become more apparent with reference to the accompanying specification and claims.

SUMMARY OF THE INVENTION

The process of this invention is named "Electrocoriolysis" and will be abbreviated as ELCOR™. The name Electrocoriolysis was coined for the process of this invention that deals with the separation of ionic species from liquid solutions by means of the combined action of electromigration of the ions in applied electric fields and of compound centrifugal force, otherwise known as the Coriolis force. The process employs electromigration to separate and concentrate ionic species, which are then collected under the combination of centrifugal force and Coriolis force. Note that in a rotating system objects not at rest with the system, such as liquids will be set in motion relative to the system under the influence of centrifugal force. Once in motion, their direction and velocity are governed by Coriolis force. Thus denser liquids will decelerate, while less dense liquids will accelerate, compared with the rotating system. Consequently, in the present description the statement "under the influence of Coriolis force" it is also meant "under the influence of centrifugal force and Coriolis force." The number of ions migrating to the electrodes of opposite polarity is directly proportional to the charge Q, transported by the ions, hence to the product of the electric current and time. The innovation in ELCOR™ is that by utilizing the appropriate combination of the electromigration of ions in an electric field and of the centrifugal and Coriolis forces, that can be made orders of magnitude higher than natural gravity, major gains are realized, for example, in water purity, the rate of separation, the separation ratio, Faradaic efficiency, energy efficiency, and eventually, the cost of water treatment. The process employs reversible electrodes instead of membranes, with the aim of achieving a continuous and more cost-effective operation than that obtained with reverse osmosis (RO), electrodialysis (ED) or with conventional electrolytic processes. The present invention relates to a process employing a rotary device wherein a liquid containing ionizable solute is continuously fed in and a stream of purified liquid and another stream of concentrated solution of the solute continuously flow out. In the ELCOR™ device one or more rotatable electrolytic cell compartments are used. The device is capable of at least two modes of operation, the electrolytic mode and the electrostatic mode, which are used advantageously for selective separation of, for example, platable heavy metal ions or of a variety of dissolved ionic species.

BRIEF DESCRIPTION OF THE DRAWINGS

FIG. 2A is a perspective representation diagram of a dynamic ELCOR™ apparatus for the treatment of liquids containing dissolved ionizable substances.

FIG. 2C is a cross-section end projection of a dynamic ELCOR™ module.

FIG. 2D1A. is a cross-sectional representation of the liquid flow of the concentrated and depleted solutions within the cells under the influence of Coriolis force in the electrolytic mode.

FIG. 2D1B is a cross-sectional representation of movement of the concentrated and depleted solution within the cells under the influence of Coriolis force in the electrostatic mode.

FIG. 2D2. is a fragmented cross-sectional representation of movement of concentrated and depleted solutions within a cell under the influence of Coriolis force, as in FIG. 2D1A and FIG. 2D1B, taken along the axis of the device.

FIG. 2E1 is a cross-sectional depiction of an embodiment of a dynamic ELCOR™ module having 2 layers of cell compartments in a cascade arrangement.

FIG. 2E2 is a three-dimensional exploded representation of a multi-stage ELCOR™ deionization device.

FIG. 2E3 is a is a frontal projection of a multi-stage ELCOR™ deionization device 300 viewing in a direction perpendicular to the end plate of the modules and parallel to its axis.

FIG. 3 is a flow diagram for the software for the ELCOR™ process in the electrolytic mode.

FIG. 7A1 is a diagram illustrating a separation of 0.1M $CuSO_4$ by means of Electrogravitation in dynamic mode and using a single cell; the flow rates for the feed, diluent and concentrate liquids are 5.55, 3.70, and 1.85 mL/min, respectively. Note that the increase in the terminal concentration of the concentrate is about double the decrease in the diluent, as expected from the flow rates.

FIG. 7A2 is similar to FIG. 7A1 but used (●) a single cell and (x) two cells in a cascade arrangement. The flow rates for the feed, the diluent and the concentrate liquids in each case were 3.70, 1.85 and 1.85 mL/min, respectively. A sub-linear increase in deionization takes place for the cascade. The broken lines at 100% of relative concentration in FIG. 7A1 and FIG. 7A2 designate the feed concentration.

DETAILED DESCRIPTION OF THE PREFERRED EMBODIMENTS

Figure 1:
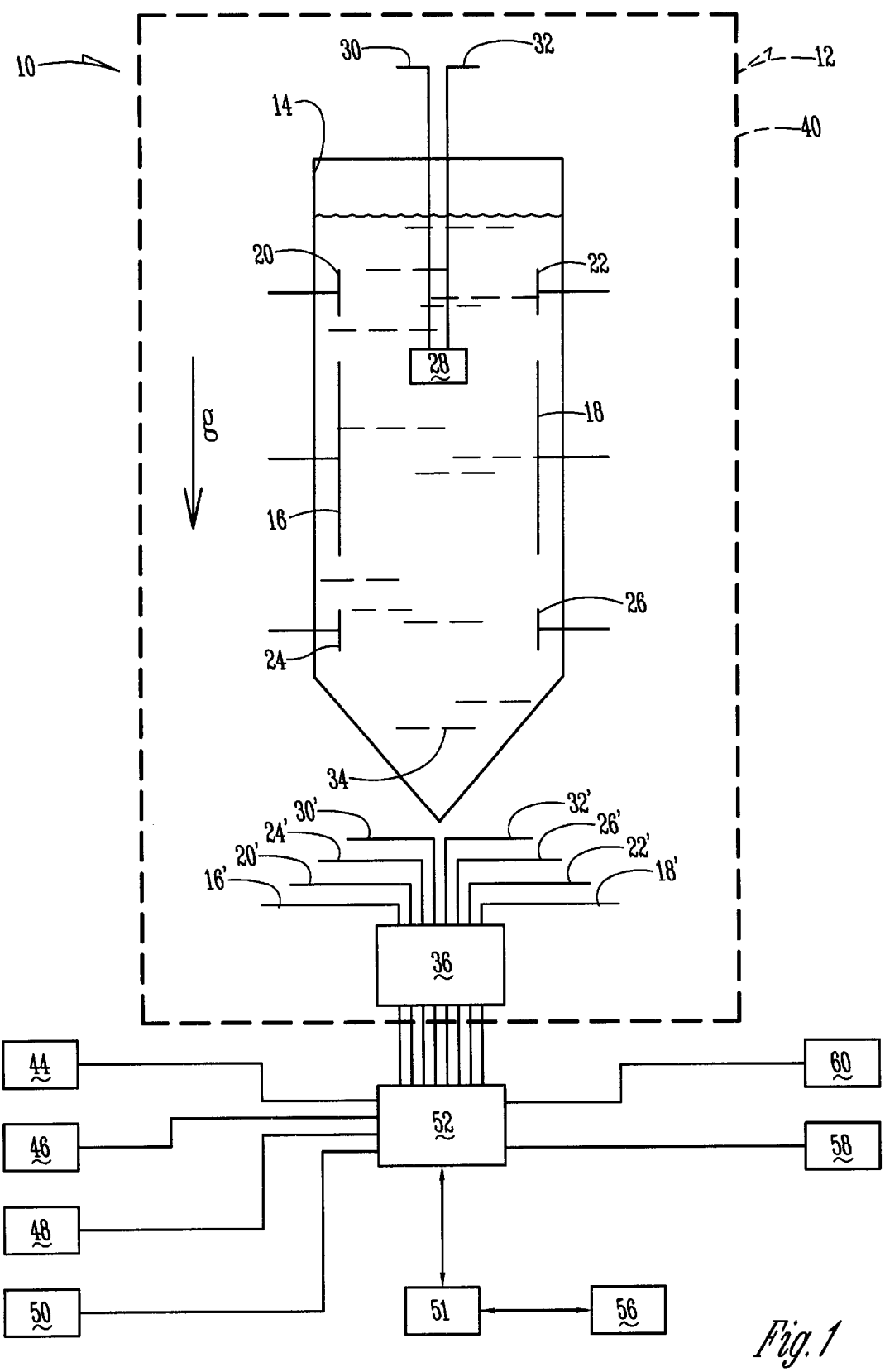
FIG. 1 is a schematic diagram of a static apparatus for separation of ionized species.

To gain a better understanding of the present invention, preferred embodiments according to the invention will now be described in detail. Reference numerals will be used to indicate certain parts and locations in the accompanying drawings. The same reference numerals will be used throughout the drawings for the same parts or locations unless otherwise indicated. The preferred embodiment, referred to as ELCOR™ (a trademark of Apogee Corporation, Ames, Iowa), is a rotary, centrifugal device in which deionization takes place in one or more cell compartments each defined by a pair of process electrodes. In a single stage process, the cell compartments are arranged with the liquid flow in parallel, while the cells are interconnected in electrical series in order to keep the current at practical levels. In this manner one side of an electrode is the cathode, while the other side is the anode (except for the end electrodes). There is one liquid feed intake port. There are two outflow ports, one for the concentrate and the other for the depleted liquid. The process fluids are sampled continuously by separate temperature-compensated conductivity cells to monitor their approximate composition. In operation, the control and monitoring of the process is done by a computer.

Scalability of the device is achieved by expanding its dimensions in axial and/or radial direction, thereby increasing the number and the size of the electrodes and cells.

The device can incorporate a single-stage or a multi-stage design, the latter for the purpose of high separation ratios. The process has the potential of a selective recovery of metal species from complex mixtures. It can also be used to separate a wide variety of ionizable substances from liquids. Parameters that are relevant to the process are (a) electrode reduction potential, (b) the transference numbers, (c) formula weight and (d) valence.

Two general types of reversible electrodes are used in the ELCOR™ process. One type includes those used for electrolytic plating and subsequent stripping of ionic species, such as heavy metals. This mode of deionization is referred to as the electrolytic mode. The second type of electrodes includes those having a high surface area (HSA) used in conjunction with double-layer electrostatic charging and discharging. This mode of deionization is referred to as the electrostatic mode. It is applicable to the deionization of a large variety of ionic substances, in particular to those that are not platable by an electrolytic process. Examples of such electrodes can be found at Ref. 37 and 38, as well as in Kaschmitter et al. U.S. Pat. No. 5,260,855 cited in Ref. 36.

Removal of copper ions from acid aqueous streams serves as a good example for deionization in the electrolytic mode. Copper or stainless steel can be used as electrodes, each preferably having a textured or roughened surface. In the case of the steel the electrode should be plated with copper to a thickness sufficient to last for the length of one pulse as determined from the total charge transported. In this process the deionization takes place via the following reversible electrode processes:

$Cu^{+2}(aq)+2e^-\rightarrow Cu(s)$ (cathode)     [Equation 1]

$Cu(s)\rightarrow Cu^{+2}(aq)+2e^-$ (anode)     [Equation 2]

The $Cu^{+2}$ ion, released at the anode surface, is joined by an anion such as the sulfate ion $SO_4^{-2}$, which is attracted to the anode, thereby forming a more concentrated solution of copper sulfate, which moves in the direction of the gravitational or centrifugal force and collects at the "bottom" of the cell. Conversely, the depleted solution around the cathode moves toward the "top" of the cell as purified water. Electrode polarity is changed after every several minutes to prevent excessive plating of the metal and thereby to assure the continuity of the process. Besides copper, other heavy metal ions successfully removed from liquid streams by ELCOR™ thus far have been $Cd^{+2}$, $Zn^{+2}$, $Mn^{30\ 2}$, $Fe^{+2}$, and $Fe^{+3}$ and the anion $Cl^{-1}$.

The mechanism for the deionization in the electrostatic mode is that during the charging process the positive ions accumulate at the surface of one of the electrodes and the negative ions at the opposite electrode while the liquid in between the electrodes is depleted of both ions. This process continues until a preset voltage is reached, which is chosen to be below the decomposition potential of the electrolyte. Thereupon the polarity is changed. The ions at each electrode are released and joined by nearby ions of opposite polarity, locally creating a dense solution. The separation of the concentrated liquid at the surface of the electrodes from the depleted liquid in between is then completed by the action of the Coriolis force.

While the use of the electrolytic mode is advantageous for the recovery of valuable heavy metals or of selected anions from waste streams, it may not be the optional choice for deionization of typical brackish water. The reason is that such water contains a variety of anions and cations each of which might require a different reversible electrode, or for most of which reversible electrolytic processes are not available. Instead, a "universal" reversible electrode applicable to the deionization of all ions present in natural brackish waters or waste waters is preferred. In a preferred embodiment of this process, operating in the electrostatic node, the ionic species are separated and concentrated by means of double-layer, capacitive charging and discharging that takes place at a high degree of kinetic reversibility. This process takes place below the decomposition potential (i. e., oxidation-reduction potential) of the electrolyte.

It is well known that the extent of capacitive charging with ordinary metallic electrodes is severely limited by electrode polarization. Consequently, such electrodes cannot attract a sufficient concentration of ions at their surface to be removed by centrifugal force in the ELCOR™ process. Furthermore, due to the fact that ELCOR™ is a Faradaic process, the rate of deionization is a direct function of the electrode current density. On the other hand, because of the high voltage resulting from high electrode polarization at a high current density, the energy efficiency would be expected to vary inversely with current. It has been shown [Ref. 4, 5]that electrode polarization can be minimized by increasing the effective electrode surface area, which gives rise to the desired increase in the current density at a lower voltage. A large electrode surface area is therefore desirable for increasing the rate of deionization and of energy efficiency. Moreover, as the current density can be increased considerably by the use of high surface area (HSA) electrodes even at low ionic concentration, it is possible to achieve a much higher level of water purity.

In recent years, so called "ultracapacitors" and "supercapacitors" have been developed which can hold enough electrical charge to approach the charge held by chemical storage batteries [Ref. 30, 31]. These capacitors employ high surface area (HSA) polarizable electrodes in which the effective surface area can be up to 100,000 times the apparent electrode area [Ref. 30]. The high surface area enhances the mass transfer rate of ions several orders of magnitude, which potentially qualifies them for the ELCOR™ process. Several varieties of such electrodes now exist, which are based on either conventional electrical double layer type capacitance [Ref. 32, 33] or on "pseudocapacitance" [Ref. 31]; such electrodes include compacted carbon powder plates [Ref. 32], activated carbon fiber cloth [Ref. 33], $RuO_2$, and conducting polymers [Ref. 31].

The triangular voltage sweep (TVS) method described by Gagnon [Ref. 34] is one of several method for determining the wetted surface area for various process electrode candidate materials. This property can be correlated with the process parameters obtained in the desalination tests.

The way such an electrode is envisioned to operate in the separation process is that the large effective surface area can accommodate a large number of ions of opposite polarity during a given pulse prior to the occurrence of substantial polarization [Ref. 32]. During the subsequent pulse of opposite polarity, these ions are released and form a concentrated salt solution with the incoming ions of opposite sign. In the ELCOR™ process the resulting concentrated solution is then subject to separation from the depleted liquid by the action of the Coriolis force.

The HSA electrodes fulfill both of the goals of practical deionization, one being the "universal" electrode for desalination of all ions, and the second being the high current density electrodes for enhanced rate, water purity and energy efficiency for water desalination by the ELCOR™ process.

The type of HSA process electrodes used for deionization in the electrostatic mode according to a preferred embodiment of the invention were supplied by the Pinnacle Research Institute, Inc. of Los Gatos, Calif. This electrode consists of a titanium metal sheet, 0.010-inch thick, coated on both sides with a porous layer of "mixed metal oxide," described by the manufacturer as consisting of tantalum and ruthenium oxides. The physical shape of the process electrodes for the electrostatic mode is the same as that of the electrodes for the electrolytic mode. The electrode has an extremely large real or "wet" surface area compared with its apparent geometric area. The ratio of the real to geometric area determined by "triangle" sweep voltammetry was found to be 73,617. Because of such a high ratio, this type of electrode is normally used in "supercapacitors" [Ref. 30, 37, 38]. A new use for this electrode in the deionization of water according to the invention has been identified.

A schematic diagram of an apparatus according to the invention for the separation of ionizable substances from liquid solutions by means of combined electric field and Coriolis force is shown in FIG. 1.0. This device is suitable for separating solute from its solution in a static mode, by concentrating it in the bottom of the cell while leaving the depleted liquid at the top of the cell. This device 10 employs a single electrolytic cell 12 housed in a cell vial 14 and having one cell compartment. Reversible electrodes 16 and 18 such as the Ag/AgCl electrodes described by Murphy [Ref. 3] serve as process electrodes, which eliminates the need for ion-selective membranes and provides the capability of non-gassing operation essential to the process. The cell is equipped with upper and lower pairs of black platinum conductivity electrodes 20, 22 and 24, 26 to monitor the depletion and the corresponding concentration of the solute at the top and the bottom of the cell, respectively. A thermistor thermal probe 28 having electrical leads 30 and 32 installed within the cell serves to provide data for temperature correction of the conductivity. A slip-ring assembly 36 (such as is known in the art) is provided to facilitate electrical interconnections from the electrical leads in the cell to the equipment outside of the centrifuge. An example of a slip-ring assembly is a Mercotac 830-SS slip-ring assembly with contacts and bushing kit. The numbers with apostrophes designate leads on the slip ring assembly that are connected to the corresponding numbered leads on the cell. The cell filled with test liquid 34 is mounted in a centrifuge 40 having an adequate range of speed and preferably equipped with a temperature control. An example of a centrifuge is International Equipment Company IEC PR-7000, general purpose refrigerated centrifuge, Model 3490.

The instrumentation (such as are known in the art) also includes an automated means of controlling and monitoring the tests. This task is achieved by means of a computerized system consisting of a number of subsystems shown in the Figure, including a conductivity meter 44, a d.c. voltmeter 46, a d.c. ammeter 48, a temperature monitor 50, a data acquisition card 51, a relay box 52, a microcomputer/data storage device 56, a relay power supply 58, and a process electrode power supply 60. The monitored parameters include elapsed time, process voltage and current, upper and lower conductivity and temperature. Examples of instrumentation include an H-19101-00 Cole-Parmer, Digital Benchtop Conductivity Meter, Recorder output and Multichannel Data Acquisition Card (DAC), Strawberry Tree Parallel Port, 16 bit, 8 inputs, DS-16-8-GP. Other instruments are well known to those skilled in the art. A Midwest Micro P5-75, 545 Meg Hard disk, 8 Meg memory desk top computer was used with a 15 inch monitor. The process power supply was an RDE5 Potentiostat from Pine Instruments. An alternate process power supply was a Model 1740, 60 V, 4 A, DC, CV, CC power supply from B&K. Low current, high voltage operation is preferable to high current, low voltage because the power losses in electrical leads and contacts are equal to the product of the square of the current and the resistance in the circuit. Thus, unless provisions are made for substantially reducing the contact resistance, the $I^2 \times R$ losses will be higher at a high current. Of course, alternative or additional monitoring devices and methods can be used such as are known to or within the skill of those skilled in the art. An example is a pH cell used as a sensor.

A design of a practical, dynamic ELCOR™ system is depicted in a schematic perspective in FIG. 2.0 showing a rotary device 110. The main subsystem of this device is the ELCOR™ module 112, in which deionization takes place. The end walls (not shown in FIG. 2.0 for clarity) of the ELCOR™ module 112 bear annular-shaped process electrodes 116, connected to the process power supply (not shown). Between them is a stack of additional annular-shaped electrodes 116 which delineate the adjacent cell compartments 117 of the ELCOR™ module. The annular electrodes are arranged preferably in electrical series, such that the process current flows in the axial direction through the entire stack of electrodes 116 and cell compartments 117. A shaft 115 extends axially through module 112. The intake and the outflow of the process liquids are achieved by means of tubing extending from the rotary union 118, located at one end of shaft 115, to the ELCOR™ module 112. In FIG. 2.0 one intake tube and only 2 outflow tubes 120 are shown for the feed liquid to be processed and for the depleted and the concentrated liquids, respectively. Additional outflow ports and tubes may be used to facilitate simultaneous separation of several species from one complex solution. Also located on the same side of shaft 115 is a slip ring assembly 122, to facilitate delivery of the process current and the monitoring of process voltage via electrical contacts 124. Not shown in the diagram are three conductivity cells, connected to tubes 120, for monitoring the concentration of the solute in the feed and the effluent liquids. The conductivity cells can be H-01481-65 Cole-Parmer platinum flow-through conductivity cells. The conductivity cells are equipped with thermistor probes to facilitate correction of conductivity for variation of temperature. A rotary drive unit 114, consisting of a motor with either a variable speed or with one or more speed settings is used to provide the centrifugal force for the ELCOR™ module. A system support 126 equipped with vibration attenuators is used for mounting the device. Additional attenuation of vibration is afforded by means of a flexible rotary coupling, know in the art, mounted between the module 112 and the rotary drive unit 114. These and other means of attenuating vibration generally used on centrifuges can be employed.

The series connection of the cells is analogous to that in a car storage battery. The difference is that in a car battery each cell has an insulated compartment and at least one pair of electrodes. Here each intermediate electrode serves as an electrode for two adjacent cells, however, it has opposite polarity on opposite sides. Thus one side is anode, while the other side is cathode and vice versa upon polarity reversal. The interconnection between the electrodes is by means of the electrolyte itself in each cell.

The velocity at which the ions traverse the spacing between the electrodes is set by the electric field applied, which, for a given species, is approximately constant in the electrolytic mode or varies between zero and a limited maximum value in the electrostatic mode. For a wider spacing it will therefore require a longer time to reach a desired level of deionization (steady state), which affects the throughput. Moreover, due to higher resistance of the liquid, higher applied voltage must be used to reach a certain electric field. Consequently, higher electrical energy is required which results in lower energy efficiency.

In one embodiment of the invention, the dimensions of the annular electrodes were as follows: outer diameter of 25.37 cm; inner diameter of 10.16 cm; thickness of 0.0254 cm to 0.0559 cm; spacing between the electrodes of 0.318 cm and 0.508 cm; outer diameter of the cell compartments 117 of 23.47 cm; inner diameter of the cell compartments of 12.70 cm. The volume per cell compartment of the two different spacings was approximately 96 and 153 mL, respectively.

Figure 2B:
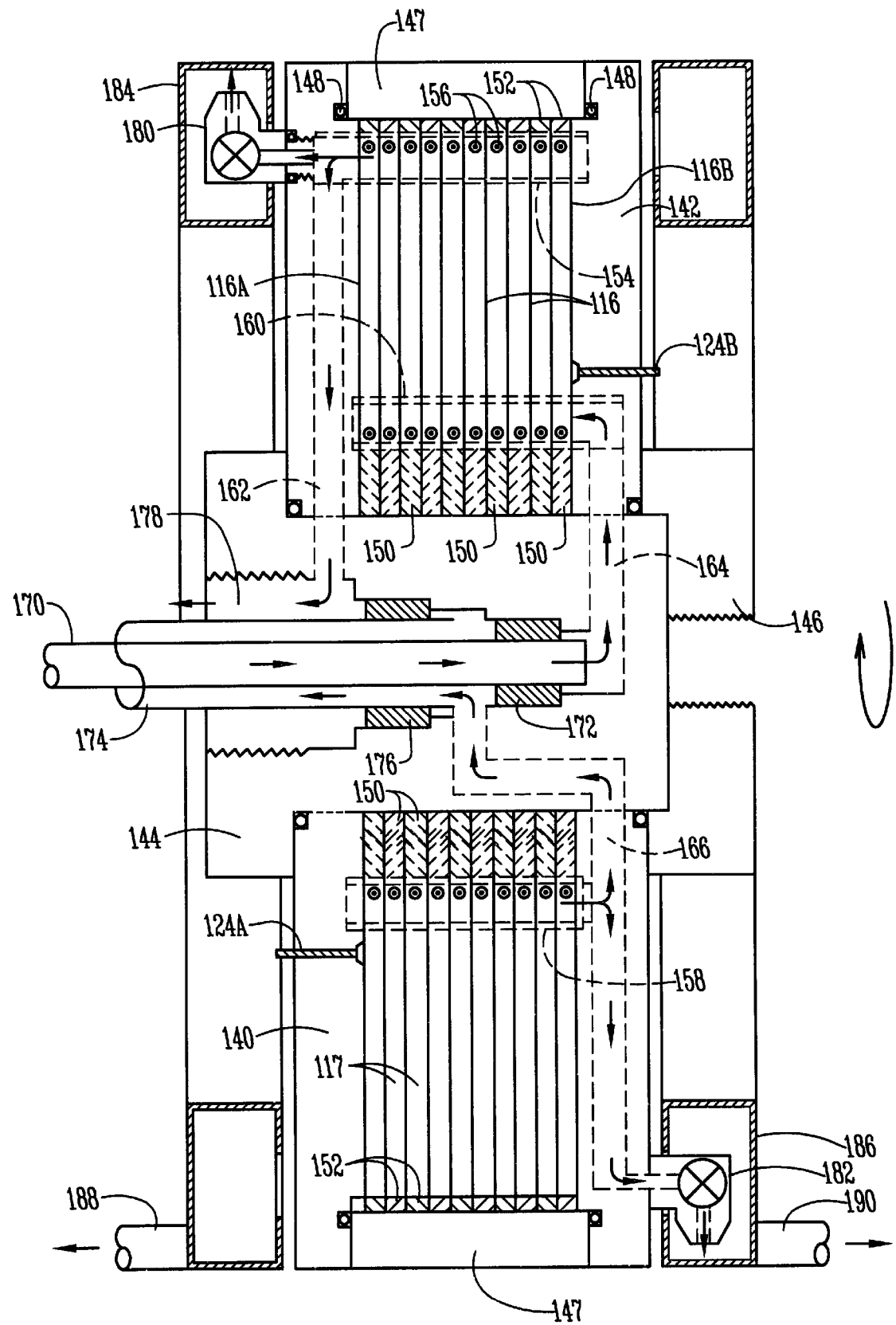
FIG. 2B is an axial cross-section type representation of a dynamic ELCOR™ apparatus with portions shown diagrammatically.

Due of the fact that in the device shown in FIG. 2A the intake and the outflow tubes are located on shaft 115, the outgoing liquids give up their centrifugal kinetic energy to the intake liquid. This means that there is no net energy used due to the acceleration of the process liquid. The energy used by the liquid is that used to support the convective flow, which is negligible plus that used to pump the liquid through the device. Not shown in FIG. 2A, but appearing in FIG. 2B is a rotary housing for the electrode assembly, consisting of annular end walls 140 and 142 and an outer cylindrical wall 147.

The scalability of the module is achieved by increasing its volume by expanding in an axial or radial direction or both. In the axial direction expansion is achieved by increasing the number of identical cell compartments, in which the process liquids are fed and removed in parallel. In a preferred embodiment the adjacent cells are in a series configuration electrically, in order to simplify the design and to minimize the electric current. It eliminates a separate electrical contact to each intermediate electrode that would otherwise be required for an electrical interconnection of the electrodes in parallel. Series connection requires much less electrical current than parallel connection. In the radial direction, expansion is achieved by increasing the diameter and thus the volume to the cell compartments. Additional layers of cell compartments may also be added as will be described further on. Not only is it more efficient to use relatively low current and relatively high voltage for energy efficiency, the slip ring assembly can better handle this use of electrical energy. High current would necessitate prohibitively huge slip rings and other hardware.

Also it is to be noted that the whole ELCOR™ unit can be expanded without additional concerns regarding inequalities of spacing or non-uniformity in sizes. It is therefore more forgiving than other devices or methods.

The dynamic ELCOR™ apparatus described above is detailed further in an embodiment as shown in FIG. 2B which shows an axial cross-section type representation of an ELCOR™ module. Only a few cells 117 are shown for convenience. Also some parts are not shown with cross-sectional cross hatching to increase clarity of structure and clarity of flow of the liquids, which is shown schematically or diagrammatically. Its components include front and rear rotatable disc enclosures 140 and 142, made preferably of electrically insulating material such as a synthetic structural polymer, such as PVC, or coated with electrically insulating material, or structural metal coated with an electrically insulating layer. Said discs are mounted on a front hub 144 preferably made of electrically insulating material, such as lexan, or coated with electrically insulating material, and a rear hub 146, made preferably of structural metal, such as stainless steel. Near the outer periphery said discs are assembled with an electrically insulating cylindrical shield 147 in between, made of material such as PVC, and fastened together by means of bolts and nuts. Neoprene or buna rubber "O" rings 148 are used to form a leak-tight interface between said discs and said shield. Annular process electrodes 116 are mounted on the front hub 144 with annular neoprene rubber spacers 150 separating them, which also serve as seals and as electrical insulators. The spacers also define the width of the cell compartments 117. An additional set of neoprene rubber spacers 152 separate the electrodes near their outer periphery. Process electrodes 116A and 116B similar to electrodes 116 are affixed to the inner surfaces of said front and rear discs 140 and 142. Electrical contacts 124A and 124B to said process electrodes 116A and 116B serve to conduct process current to the cell compartments 117, which are arranged in an electrical series configuration, according to the preferred embodiment of this invention. Near the outer periphery of each electrode 116, 116A and 116B there is a circular opening to house an electrically insulating tube 154 made of lexan having perforations 156 located in each cell compartment. Note that tube 154 can actually fit within a concave space made in the inner side of spacer 152 to place tube 154 as near to the perimeter as possible. The ends of the perforated tube are anchored in the inside walls of the front disc 140 and the rear disc 142. Two similar circular openings on each of said electrodes are located near the outer periphery of said rubber spacers 150 to house similar, perforated, electrically insulating tubes 158 and 160. Of the said three perforated tubes, tube 160 serves as a distributor for the intake liquid, while tubes 154 and 158 serve as collectors for the outflowing solute concentrate and the purified solvent, respectively. The exact positioning of tubes 154, 160, and 158 can vary somewhat, but the drawings show generally preferred positions. Channels 162 located within the wall of the front disc 140 and within the body of the front hub 144 and channels 164 and 166 located within the wall of the rear disc 142 and within the body of the front hub 146, serve to connect said perforated tubes 154, 158, and 160 with the inlet and outflow ports for the process liquids, which are located both in the front hub and in the front disc as will be detailed further on.

The means of the intake and outflow of the process liquids is described next. Two different configurations are depicted in FIG. 2B. In one configuration the intake of the liquid into the module is accomplished via a stationary feed pipe 170, made of stainless steel, which projects into the front hub 144 through a seal bearing 172. The outflow of the purified liquid takes place through stationary concentric pipe 174, also made of stainless steel, which projects into a seal bearing 176. The outflow of the concentrate takes place through a concentric cavity 178 also located in the front hub 144. The feed pipes 170 and 174 and the cavity 178 are concentric with the front hub 144 and they extend from within the rotary union 118 shown in FIG. 2A which is joined to said front hub. The rotary union 118 in this configuration was a 6000 Series Duoflow Union, manufactured by the Deublin Company, of Waukegan, Ill. The direction of the liquid flow is indicated by short arrows within each tube, cavity or channel. Pipes 170, 174 and cavity 178 lead into the said rotary union 118. In this first configuration the flow of the liquids requires one or more pumps, to pump the liquid in or out or both. The flow control can be achieved by means of metering pumps and/or metering valves. The metering pumps can be a H-07523-20 Cole-Parmer Masterflex L/S pump drive, 10-600RPM, with digital read out, and accommodating two pump heads, 0.009-40 GPH.

It is to be understood that provisions can be included in the ELCOR devices or methods for exhausting gases that might build up during the processing of the fluids. For example, a suitable exhaust system (not shown) could be provided near the hub to let out any gases electrolytically created or trapped.

The second configuration for the liquid flow takes advantage of the centrifugal force. In this case the liquid intake is accomplished in a manner similar to that just described. The outflow of the purified liquid and of the concentrate takes place however through two outlets 180 and 182 each of which may contain a metering valve, both located near the periphery of front disc 140 and rear disc 142 to control the rate of flow. Outlets 180 and 182 can be variable microvalves. Instead of the metering valve a demountable orifice can be used that has a specific inside diameter (I.D.) for a desired rate of flow and at a given centrifugal force. For example, at a centrifugal force of 73 G the flow rates of the fluid through two different orifices, made of stainless steel, having inside diameters of 0.025 and 0.030 inches, were 130 and 200 mL/min, respectively. In a preferred embodiment outlets 180 and 182 point tangentially to their path of rotation and 180 degrees away from the direction of rotation of the ELCOR™ module. A pair of annular, stationary spillways 184 and 186, made of non-corroding material such as lexan or stainless steel, adjacent to the front and the rear discs collect the processed liquids ejected through outlets 180 and 182, which then flow out through ports 188 and 190. In this configuration the processed liquids are accelerated by the centrifugal force toward the periphery of the module. When they are ejected through said outlets 180 and 182 a pumping action results whereby the feed liquid can also be aspirated from its external source through the feed pipe. Thus, in this configuration the ELCOR™ module also acts as a centrifugal pump. Consequently, optionally no external pumps are needed, which results in a simpler and a more cost-effective device. It is emphasized that in this configuration the seals must be air-tight to prevent any air from being aspirated into the module.

Another consequence of the second configuration is that if an external pump is used for the feed liquid, the rotational motion of the module may be supplied by the action-reaction of the liquid being ejected through the outlets 180 and 182. Thus, optionally, in this mode there may be no need for an external rotary drive for the ELCOR™ module, which is another important factor toward the simplification and cost reduction of the device.

A further description of the ELCOR™ module can be made with the aid of FIG. 2C, which depicts a schematic cross section transverse to the axis and through the center of one of the cell compartments 117. The figure reveals the exposed side of the electrode 116a, the projections of the features of the front disc 140, the cross sections of the front hub 144, the rubber spacers 150 and 152, the perforated tubes 154, 158, and 160, the cylindrical shield 147, and of the electrically insulating bar spacer 192. The function of the bar spacer 192 is to provide a radial wall for the liquid inside the cell compartment, to keep it at rest with the cell compartment during centrifugation, except for the intended motion related to the feed and outflow of the process liquids and the convective motion occurring as a result of the ELCOR™ process. The projection of channel 162 in said front disc 140 is shown, continuing into the front hub 144 and then to the outflow cavity 178, which is concentric with outflow pipe 174 and the feed pipe 170. Also shown in FIG. 2C are the projection of conduit 164 connecting tube 160 to concentric tube 170 and optional conduit 166 connecting tube 158 with concentric tube 174. FIG. 2C shows a broken line 179 to indicate that a band from boundary 179 outward on each electrode can include a layer or coating (e.g. clear acrylic paint) to reduce as much as possible contact between the concentrate and the electrode; which could otherwise draw electrical current.

As alluded to above, during the ELCOR™ process a complex flow of the process liquid is established within each cell compartment 117, as described qualitatively with the aid of FIG. 2D1A and FIG. 2D2. The former shows a radial cross-sectional view which reveals the flow patterns in the plane of the electrodes during the deionization of a copper sulfate solution. The solid arrows, along the surface of the cathode indicate the radial component of the flow of the dense, concentrated solution along the cathode toward the outer periphery of the electrode, while the dashed arrows along the surface of the anode show the radial component of the flow of the less dense purified liquid along the surface of the anode toward the axis. The direction of this motion is due to the Coriolis force. FIG. 2D2 depicts the liquid flow patterns as viewed in the direction transverse to the plane of the electrodes. Here the corresponding flow patterns show considerable curvature which is due to the Coriolis force. The concentrated solution, again represented by the solid lines, as it moves outward, undergoes angular rotational deceleration and lags behind the rotation of the module. On the other hand, the purified liquid, represented by the dashed arrows, as it moves inward, undergoes angular rotational acceleration and speeds up relative to the module. This described effect of the relative motion of the liquid components is essential for the separation of the processed liquids and its understanding is most helpful in designing the geometry of the cell compartments, and their feed and outflow ports. Thus the feed port 160 is located near the inner periphery or the "bottom" of the cell compartment and near the bar spacer, in a position referred to as the "rear" of the cell compartments 117. The feed liquid becomes distributed throughout the cell while the ELCOR™ process is taking place. The outflow port 154 for the concentrated solution is located advantageously also at the "rear" of the cell compartments 117 and towards the outer periphery or the "top" of the cell compartments at a point toward which the liquid moves under the action of the Coriolis forces. The outflow port 158, for the purified liquid, is also located advantageously near the "bottom" and at the opposite end, or the "front" of the cell compartments 117, at a point toward which the liquid gravitates under the influence of said forces. It should be noted that in the preceding description the concentrated solution was assumed to have a greater density than the purified liquid. In cases where the concentrate would be less dense than the diluent the relative position of the inlet and the outlets would be rearranged in accordance with the effect of the Coriolis force on the flow patterns as described in this invention.

FIG. 2D1B illustrates that in the electrostatic mode, concentrated solution (solid arrows) moves along both electrode surfaces outward and the less dense purified liquid (dashed arrows) moves inwardly. FIG. 2D2 again illustrates generally the flow of the concentrated, purified and feed liquids relative to the surface of the electrodes.

The movement of the liquid is analogous to that in FIG. 2D1A and B and FIG. 2D2. First of all, under the action of centrifugal force, a denser liquid at the process electrode surface will tend to flow in the direction of that force, and less dense liquid in the opposite direction. Once set in motion the liquids will be subject to Coriolis force, and the denser liquid will start deceleration, and the less dense liquid accelerating. However, as both liquids will encounter the walls of the cell, the dense liquid will slide along the wall, collecting at the outer periphery and the less dense liquid collecting at the inner periphery.

It should be noted that at constant operating conditions of process current, rotational speed, feed and outflow rates, a steady state is established within the module with the result that a constant composition is established for each of the effluents.

The ELCOR™ module can utilize a single-stage or a multi-stage or a cascade design, the latter for the purpose of achieving high separation ratios. Expansion in the radial direction by adding one or more layers of cell compartments is particularly favorable for a multi-stage design. In this device there is a provision for the process liquids to flow in a counter-current manner to and from adjacent layers of cell compartments. The denser liquid, which in most cases is the concentrated solution, flows radially outward to the next layer, while the less dense, usually the depleted liquid, flows inward.

A cascade arrangement of cell compartments is shown schematically in FIG. 2E1, which depicts a cross section, transverse to the axis, of a cascade ELCOR™ module 200 consisting of two concentric layers of cell compartments 202 and 204. The inner layer of cell compartments is similar to cell compartments 117 shown in FIG. 2B and FIG. 2C. The outer layer of cell compartments has narrower process electrode widths and has an added intake port. The intake and outflow ports are connected in tandem. The feed port 206 for the liquid to be processed is located in the outer layer near the "bottom" and the "rear" of the cell compartments, similar to FIG. 2C. The outflow port 208 for the concentrated solution is also located similarly to FIG. 2C, near the "top" and the "rear" of the cell compartment of the outer layer. The outflow port 210 for the purified liquid is located in the lower layer of cell compartments 202, near the "bottom" and the "front" of the cell, as in FIG. 2C. The remaining two sets of ports in each of the two layers of cell compartments are interconnected in tandem to facilitate counter-current flow facilitated by the action of the Coriolis force. Thus, the outflow port 212 of the outer layer for the depleted liquid located at the "bottom" and the front of the cell compartments is connected to the intake port 214 of the inner layer located at the "bottom" and the "rear" of the cell compartments. Analogously, the outflow port 216 for the partially concentrated solution, located in the "top" and the "rear" of the cell compartment of the lower layer is connected to a added intake port 218, situated at the "top" and the "front" of the cell compartment of the outer layer. Members 292A and 292B are radial walls that function for each cell like wall 192 of FIG. 2C. Insulating spacers are similar to 150 and 152 of FIG. 2C.

In the cascade design each layer of cell compartments may be connected to a separate electrical power supply, or it may be connected electrically in parallel with the preceding or subsequent layers. In the latter case, the voltage applied across each layer is the same, whereas the electrical current flowing through each layer of cell compartments is in general different.

A cascade, or multi-stage design with deionization compartments arranged in the axial direction is described next. In FIG. 2E2 there is depicted a three-dimensional exploded representation of a multi-stage ELCOR™ deionization device 300 consisting of three deionization modules 312A, 312B, and 312C mounted on a common hub 344. Said modules are similar to module 112 in FIGS. 2B to 2D2, inclusive, with minor differences described below. Consequently, only the most relevant features are included in FIG. 2E2. First a comparison is made of module 312A with module 200. As shown by the three arrows at the outer periphery of the modules, the device is made to rotate in the clockwise direction. Accordingly, the electrically insulating bar spacer 392A, similar to item 192 in FIG. 2C, defines as the "rear" of the cell compartment the cavity adjacent to its right side (as viewed) and as the "front" of the cell compartment the cavity adjacent to its left side. As explained in the description of device 200, this notation comes about as a consequence of the action of the Coriolis force. Module 312A has four perforated tubes whereas module 112 has three. Tube 360A (similar to tube 160) serves as a distributor for the intake liquid, while tubes 354A and 358A, similar to tubes 154 and 158, serve as collectors for the outflowing solute concentrate and the purified solvent, respectively. The main difference in the three modules from that of module 112 is the presence of one additional perforated tube for intake liquid, 361A, 361B, and 361C, one in each module, similar to item 218 in FIG. 2E1.

The deionization in the three modules takes place in a manner analogous to that in module 112, except that the modules are interconnected in such a way that the diluent and the concentrate liquids are communicated between adjacent modules in a counter-current fashion so as to both increase the purity of the diluent and to maximize the concentration of the concentrate. The sequence of the liquid flow begins with the feed liquid 359 entering tube 360A. The path of the process liquids is indicated by dashed lines and by arrows. As deionization proceeds, the diluent of module 312A issuing from tube 358A enters the rear, lower intake tube 360B of module 312B for additional purification. Then, similarly, the diluent from module 312B enters the lower intake tube of the next module and so on. In the present case only three modules are shown is a tandem sequence. From the last module 312C the further purified diluent 363 issues from tube 358C as one of the final products of the deionization. A pump, not shown, connected to the effluent port and tube 358C removes the diluent and provides one of the means of propelling the liquid through the tandem series of modules. Now, the concentrate resulting from the deionization process in module 312C, issuing from tube 354C enters the tube 361B of module 312B, in a counter-current flow pattern, and becomes the second source of liquid feed for that module. It is important to note, that in this manner the diluent, that is the less dense component of the feed, enters the module near the hub, while the concentrate, the more dense component, enters at near the outer periphery. Consequently, there is no mixing of the two liquids, which would be counterproductive to the deionization process. The concentrate from module 312B, issuing from tube 354B in a similar manner enters the tube 361A of module 312A. The final concentrate, being a highly concentrated product or waste is withdrawn by a second pump connected to a port communicating with the effluent tube 354A. Note that the effluent port 361C remains unused, which is analogous to tandem configuration of FIG. 2E1, in which the bottom module has only 3 tubes.

The second pump provides an additional means of propelling the liquid through the tandem arrangement of modules. The third means of the propulsion of the process liquids is via the combination of Coriolis and centrifugal forces. This happens as a consequence of the deionization process. Under the influence of said forces the concentrate accumulates near the outer periphery and the diluent near the hub and the accumulation of the liquids creates pressure that drives the liquids toward their respective exhaust ports.

Figure 3:
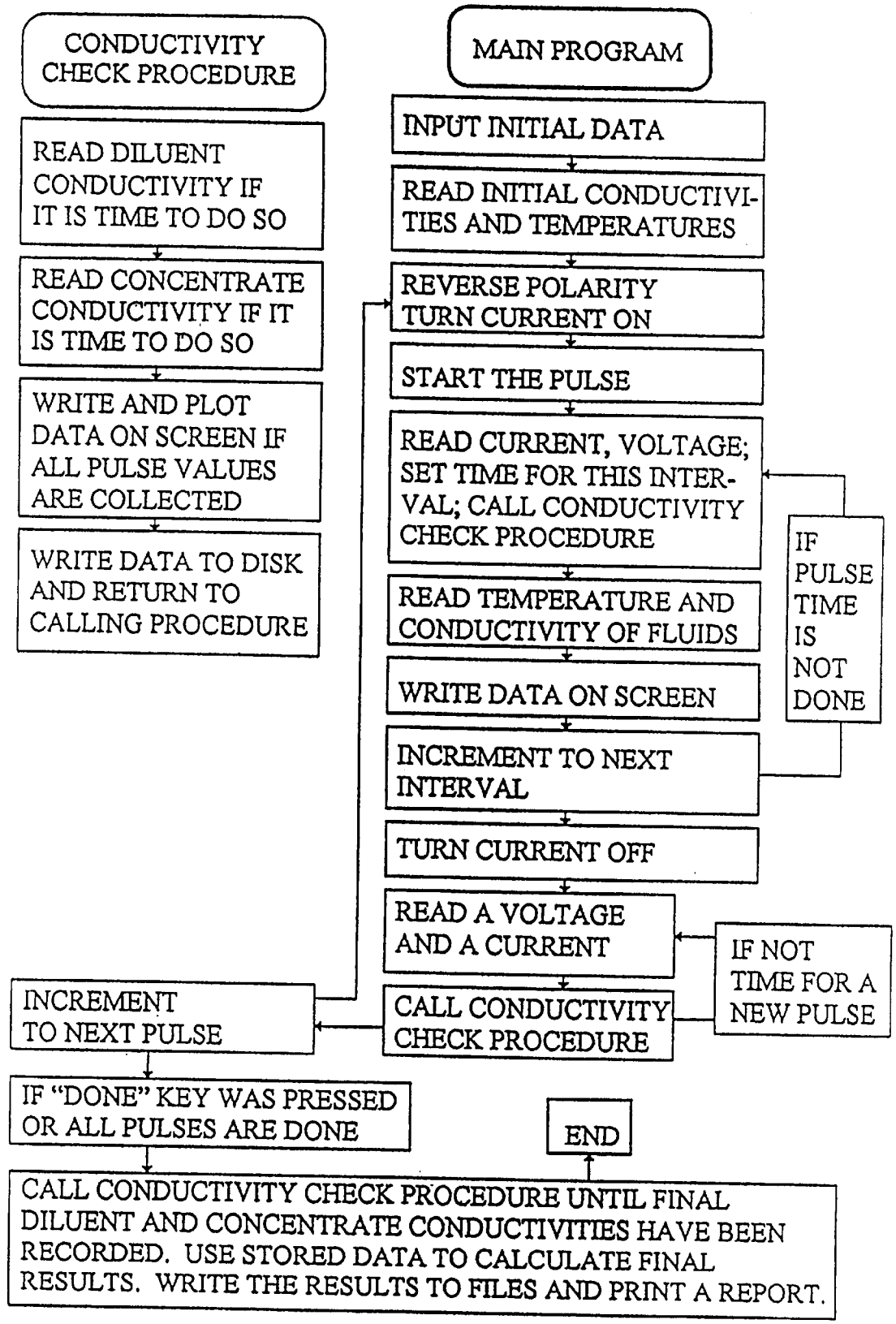

An assembly of two or a plurality of modules can be assembled in a multistage configuration in at least two ways, one of which is depicted in part in FIG. 2E2, namely as a single unit on a common hub. Additional details of this configuration are depicted in FIG. 2E3. A second way is the interconnection of discrete single-stage units, which will also be described further on.

FIG. 2E3 is an end-on representation of the multi-stage ELCOR™ deionization device 300 perpendicular to the sides of the modules and parallel to the axis. What is shown is a front projection of superposed modules in the order described above. An alignment of the outflow tubes with the intake tubes of the adjacent modules is evident as is the progression of the angular position of the rubber spacers 392A, 392B, and 392C of the three modules, respectively. The modules are in close contact; physical interconnection of the tubes is made by means of rubber "O" rings and compression of the modules by bolts and nuts. As in module 112, the cells in each module are in an electrical series interconnection. One pair of electrical contacts is made to each module. The modules are connected to a power supply and to each other in parallel by means of a pair of electrical leads extending from an external rotary union, shown in FIG. 2A, throughout a conduit within the hub 344, to the end of the module assembly.

One advantage of this configuration is that optionally no separate insulating chamber end plates are needed; one pair is sufficient for the entire multi-stage assembly. The process electrodes themselves can serve the purpose of inter-module end plates, wherein the end electrode in between two adjacent modules serves as the electrode for the end cells of both modules. In this manner one entire set of parallel electrical leads is saved as well.

In the case of a multi-stage interconnection involving discrete single-stage deionization devices, the liquids are communicated in between the devices by means of tubing and auxiliary pumps. Electrical power can be supplied separately, or optionally, the modules can be connected in parallel.

The ELCOR™ process has the potential of a selective recovery of metal species from complex mixtures. The parameters that can make it possible are (a) electrode reduction potential [Ref. 15, 16], (b) the transference numbers and (c) the relative velocities of the different concentrated species when subjected to Coriolis force.

The spacing between process electrodes 116, which is also the width of the cell compartments 117, is an important parameter, as both the throughput and the energy efficiency are inversely proportional to it. Thus, while large spacings, say of the order of several centimeters are functional, they are not useful because of low performance. Narrow spacings are limited by the width of the concentrated and depleted layers around the electrodes, which is estimated to be about 10 nm each as well as their opposing convection motion which would cause mixing. While separation as low as 3 mm has been used successfully in the laboratory and smaller separations are possible, it appears that the optimum separation will also be affected by the size of the device, which suggests that it should be optimized for a given design.

Regarding the process electrodes, the preferred electrode is made of electrolytically inert material such as carbon or graphite. A further preferred property is that the electrode has a high surface area in order to optimize electrical energy efficiency and to maximize the purity of the treated water.

For a dynamic deionization in either the electrolytic mode or in the electrostatic mode, an EG demountable cell operating in a dynamic mode in which the feed liquid is continuously fed in and the depleted liquid and a concentrated liquid are continuously removed was used. Such a cell operates in the electrogravitational (EG) mode, that is, under the influence of natural gravity. The cell, built of Plexiglass was a rectangular cavity 20 cm long, 8.9 cm high and 0.48 cm wide. Two process electrodes, ca. 20 cm long and 5 to 7.5 cm high were mounted on the opposing vertical cell walls by means of a double-faced adhesive tape. The long dimension of the cell was inclined 30 degrees with respect to the horizontal. Electrical contacts to the electrodes were made by means of two strips of platinum foil. The feed liquid port was situated at the lower of the two corners along the upper edge of the cell. The port for the depleted effluent liquid or "diluent" was located at the lower of the two corners of the lower edge of the cell, while the port for the enhanced effluent liquid, or the "concentrate" was located at the upper corner of the upper edge of the cell. This configuration was conducive to creating a convective flow in the cell whereby effective deionization could take place. The feed and effluent ports were placed in line with separate conductivity flow cells, Cole Parmer Instrument Company, model number 1481-65, equipped with thermistors for automatic temperature correction to 25° C.

A constant current power supply from BK Precision, model number 1646 was used for process current. The parameters monitored included elapsed time, process voltage and current, the conductivities of the feed, diluent and concentrate, and temperature. Other instrumentation is possible, as is within the skill of those skilled in the art.

Figure 4:
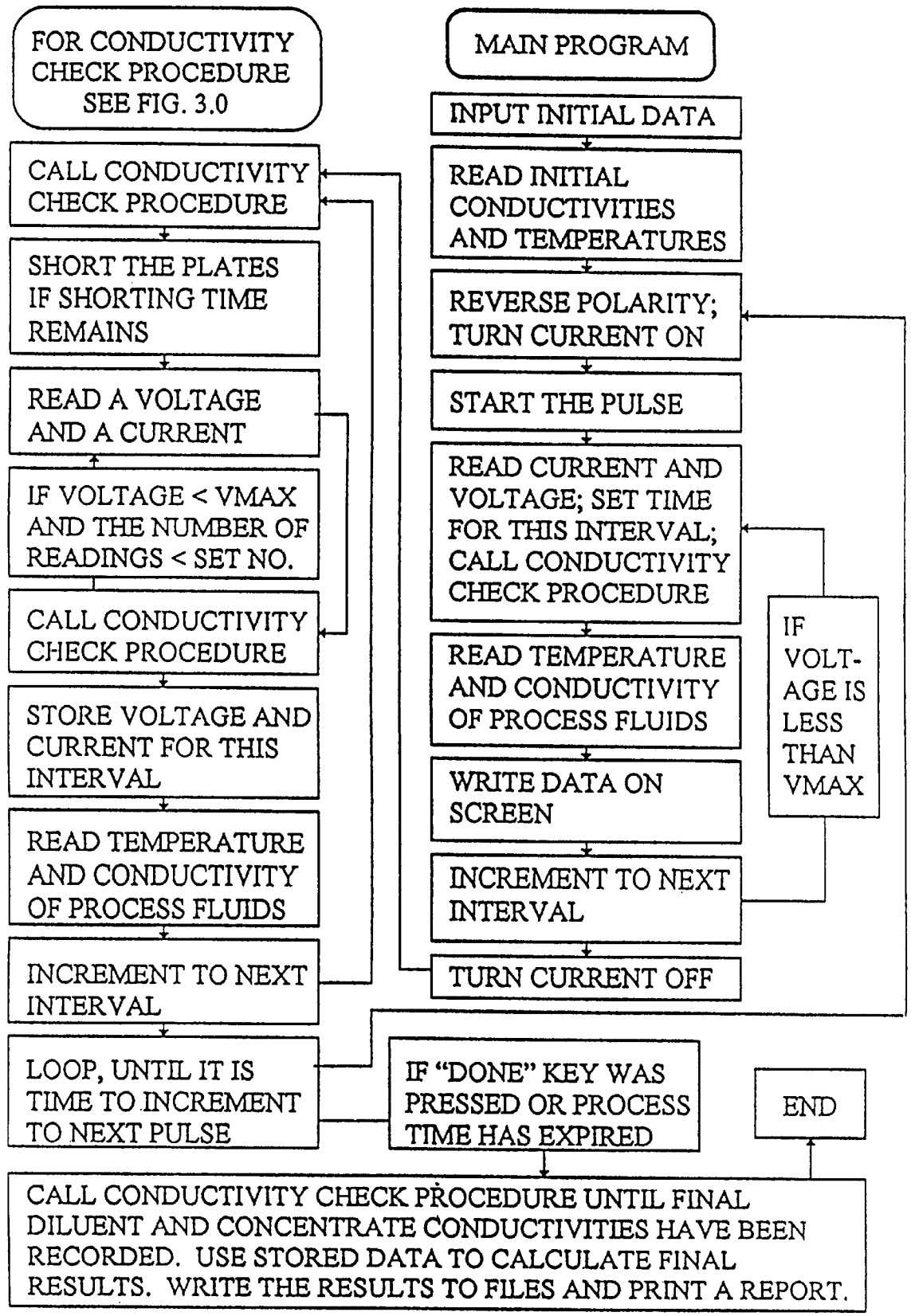
FIG. 4 is a flow diagram for the software for the ELCOR™ process in the electrostatic mode.

The preferred embodiment of the instant invention can include computer software for monitoring, control of the ELCOR™ system in operation as well as collection, and reduction and evaluation of the data for the deionization process. The software can include continuous monitoring of the process parameters including voltage, current, and conductivities of the process liquids in motion. Separate versions of software for the electrolytic and the electrostatic modes of operation are outlined in the form of flowcharts shown in FIGS. 3 and 4. The two versions perform similar tasks, the chief difference being the switching of polarity of the applied current after a specified period in the former and after a preset voltage was reached (typically 1.0 to 1.2 V per cell in the preferred embodiment) in the latter mode. From the data collected the observed and theoretical relative concentration are computed and plotted in real time on the monitor screen along with process voltage. Thus, it is feasible to detect instantaneously the occurrence and the extent of deionization. Additional software can be used for subsequent evaluation of parameters including the following:

| Acronym | Parameter | Units |
|---|---|---|
| DSO | observed relative deionization | (%) |
| ONH | observed relative enhancement | (%) |
| DST | theoretical relative deionization | (%) |
| TNH | theoretical relative enhancement | (%) |
| FED | Faradaic efficiency | (%) |
| FEFD | Faradaic deionization efficiency | (%) |
| FEFC | Faradaic enhancement efficiency | (%) |
| — | rate of mass removal per unit of energy | (kg/kWh) |
| — | rate of energy usage per unit volume of water deionized | (kWh/m$^3$) |
| COSTW | cost per unit volume of water deionized | ($/m$^3$) |
| COSTCP | cost per unit weight of chemical compound recovered | ($/kg) |
| COSTI | cost per unit weight of metal ion or anion recovered | ($/kg) |

Examples of deionization with the ELCOR™ device in the electrolytic mode are described next.

Example A.

Deionization of KCl and NaCl in a "Static" System

Deionization experiments were performed on KCl and NaCl solutions in a static system depicted schematically in FIG. 1, in which desalinated water moved to the top of the test tube and the concentrated solution to the bottom, with no water flowing in or out of the cell during the run. The experimentation involved numerous deionization tests over a matrix of four independent parameters including centrifugal force, initial salt concentration (KCl and NaCl), process current and current pulse width. In an example of deionization conducted with an aqueous solution of KCl, having initial concentration of 0.1M (molar), at an average centrifugal force of 200 G at the center of the cell, 75% of the dissolved KCl was removed from the top of the cell and was concentrated at the bottom. The resulting high concentration gradient (25%→175%), had the effect of attenuating the rate of the deionization. This condition is alleviated in dynamic deionization of a practical ELCOR™ device where the effluents are removed.

Figure 5:
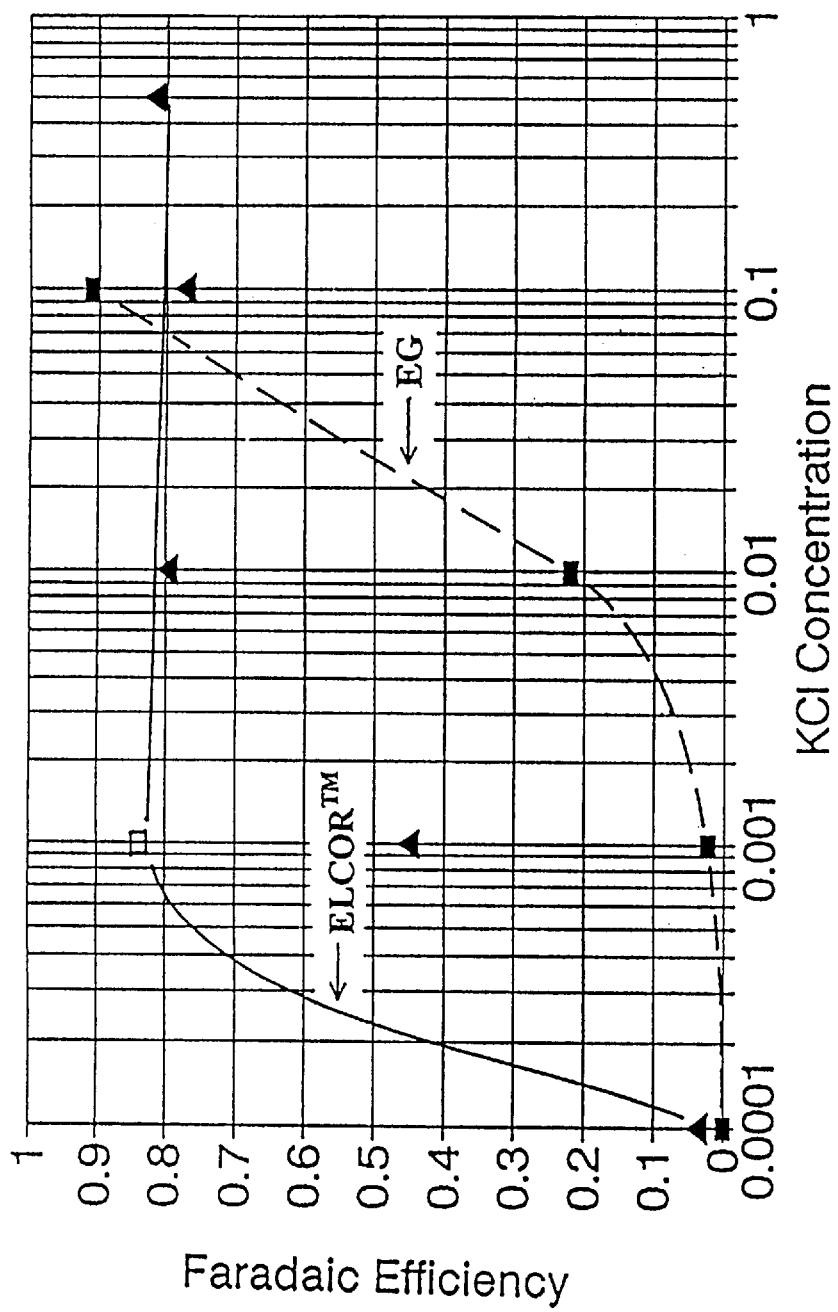
FIG. 5 is a comparison of the ranges of KCl concentration over which effective desalination occurs by means of existing Electrogravitation (EG) and of the ELCOR™ process.
Figure 6:
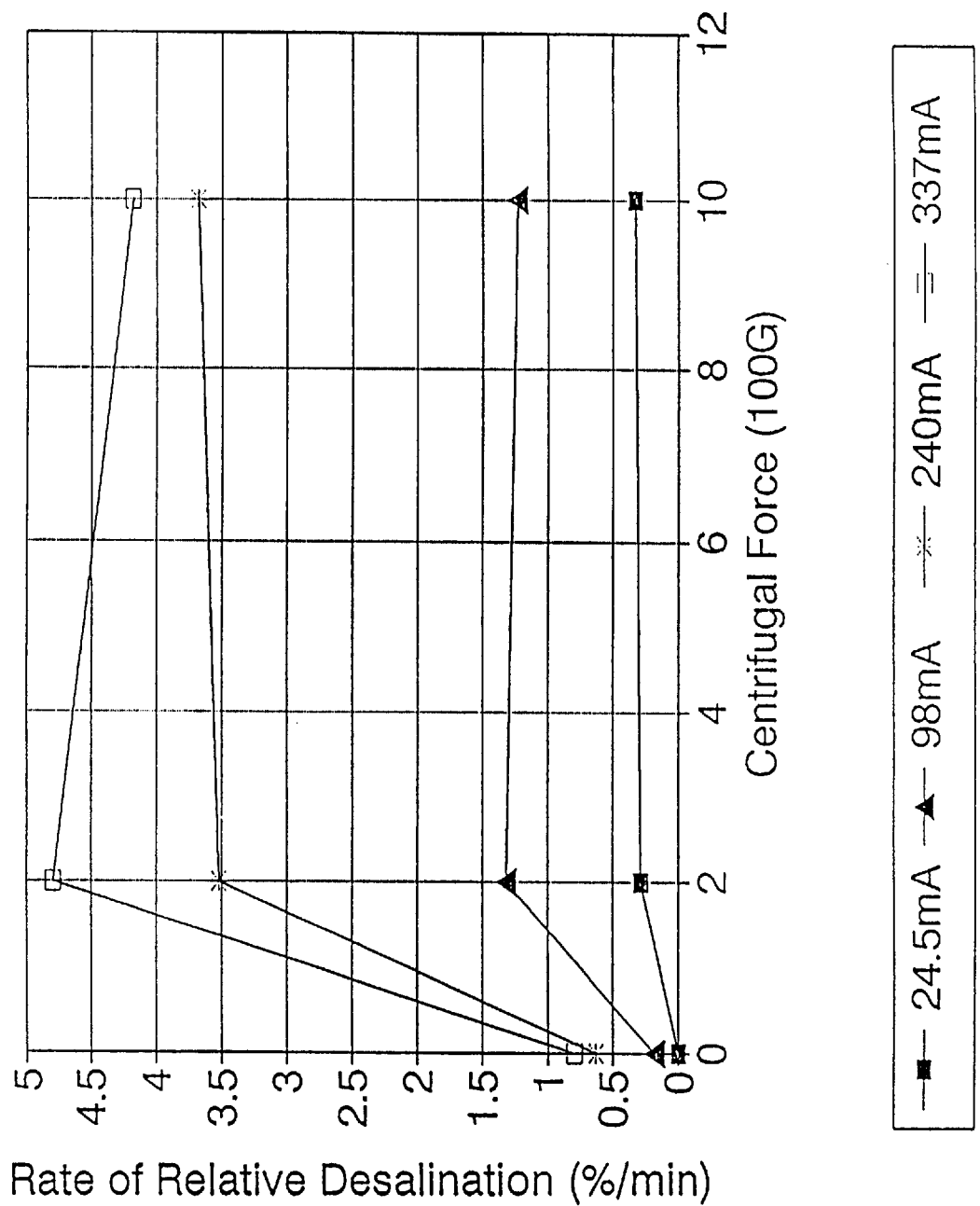
FIG. 6 is a rate of desalination of KCl by ELCOR™ vs. centrifugal force over a range of values of the process current.

Experiments with the static ELCOR™ cells have provided evidence that deionization by means of combining electromigration with centrifugal force, of elevated magnitude, is superior to that of combining it with gravitational force, as shown in FIG. 5 and FIG. 6. In FIG. 5 ELCOR™ is shown 100 times more effective than EG in achieving higher water purity. This is shown in terms of Faradaic efficiency vs. KCl concentration for the two cases. (Note that Faradaic efficiency is given in absolute numbers, i. e. 1.0=100%). Additional results in FIG. 6 show the deionization rate at various settings of process current as a function of centrifugal force. The rate of deionization for ELCOR™ was about 6 times greater than for EG. Note that G=1 designates EG and G>1 designates ELCOR™. The results of this work show that: (a) the ELCOR™ process is 100 times more effective in producing higher water purity than EG; (b) the range of deionization for ELCOR™ in the static mode was from at least 0.6N to 0.0001N (~5 PPM NaCl); (c) the rate of deionization with ELCOR™ is about 6 times greater than with EG (for 0.1N KCl); and (d) the energy efficiency and the estimated cost of deionization for the ELCOR™ process have been found favorable compared with reverse osmosis or electrodialysis.

Impressively high values of energy efficiency are obtained with the ELCOR™ process. The rate of solute removed per unit of energy varies inversely with current, because in order to achieve higher currents, process voltage must be increased. Typical values for the energy rate at concentrations of 0.5, 0.1 and 0.01N at high levels of current (to yield rapid deionization) were 1.6, 1.5, and 3.8 kg/kWh, respectively. When converted by appropriate equations to energy per volume of desalinated water and cost per volume, the values obtained are 23.4, 4.7, and 0.20 kW/m$^3$, and 2.34, 0.47 and 0.02 \$/m$^3$, respectively. In this calculation the cost per cubic meter data assume the cost of energy of \$0.10/kWh and consider only the electrical energy used in the ELCOR™ cell and neglect other costs.

Also demonstrated in the static ELCOR™ device was the deionization for NaCl for concentrations of 0.001, 0.01, 0.1, and 0.6N, the latter being sea water.

Example B.
Deionization of $CuSO_4$ in a Static EG Mode

The next proven application of the ELCOR™ process is the separation of heavy metal. We chose a 0.2N solution of copper sulfate for this demonstration. Initial experiments were done in the static mode using gravitational force (i. e., the EG mode) and with long dc current pulses with alternating polarity. In this process the deionization takes place via reversible electrode processes defined by Equations 1, 2 above. The $Cu^{++}$ ion, released at the anode surface is joined by an anion such as the sulfate ion $SO_4^{-2}$, which is attracted to the anode, thereby forming a more concentrated solution of copper sulfate, which moves in the direction of the gravitational or Coriolis force and collects at the bottom of the cell. Conversely, the depleted solution around the cathode moves toward the top of the cell as purified water. Using a single cell, in static tests, as much as a 70% depletion of the original concentration has been observed at the top of the cell and a corresponding enhancement at the bottom.

The preceding electrode reactions do not indicate any participation of the anionic species in the electrochemical process (except in the first half of the first cycle, when one of the electrodes must be initially plated with the metal and oxygen evolution takes place at the anode). Yet both the cation and anion are removed and concentrated in the effluent and the initial feed or waste water is purified. This represents an important difference between the ELCOR™ and the existing electrowinning processes. One of the beneficial effects is that there is no gassing which would interfere with the liquid convection crucial to the process. The second benefit is a very low operating voltage and power consumption because there is no net overall reaction. The third benefit is that due to the fact that during each half-cycle, all or most of the deposited metal is removed from the process electrode, whereby both of the electrodes are repeatedly cleaned, which helps to make the process continuous. It should be also pointed out that the ELCOR™ process concentrates the solute as effluent in a substantially reduced volume, from which the metals can be plated out by an existing commercial batch process, which is a final major difference between ELCOR™ and the existing electroplating processes.

Example C.
Deionization of $CuSO_4$ in an EG Dynamic Mode.

Additional experiments were performed in a dynamic mode using only gravitational force (i. e., the EG mode). The devices employed included a single cell compartment or two or more cells operating in tandem, in a cascade arrangement. Examples of the resulting successful dynamic deionization appear in FIG. 7.

Example D.
Dynamic Deionization of 0.01 molar $CuSO_4$ in the ELCOR™ Device.

Figure 8:
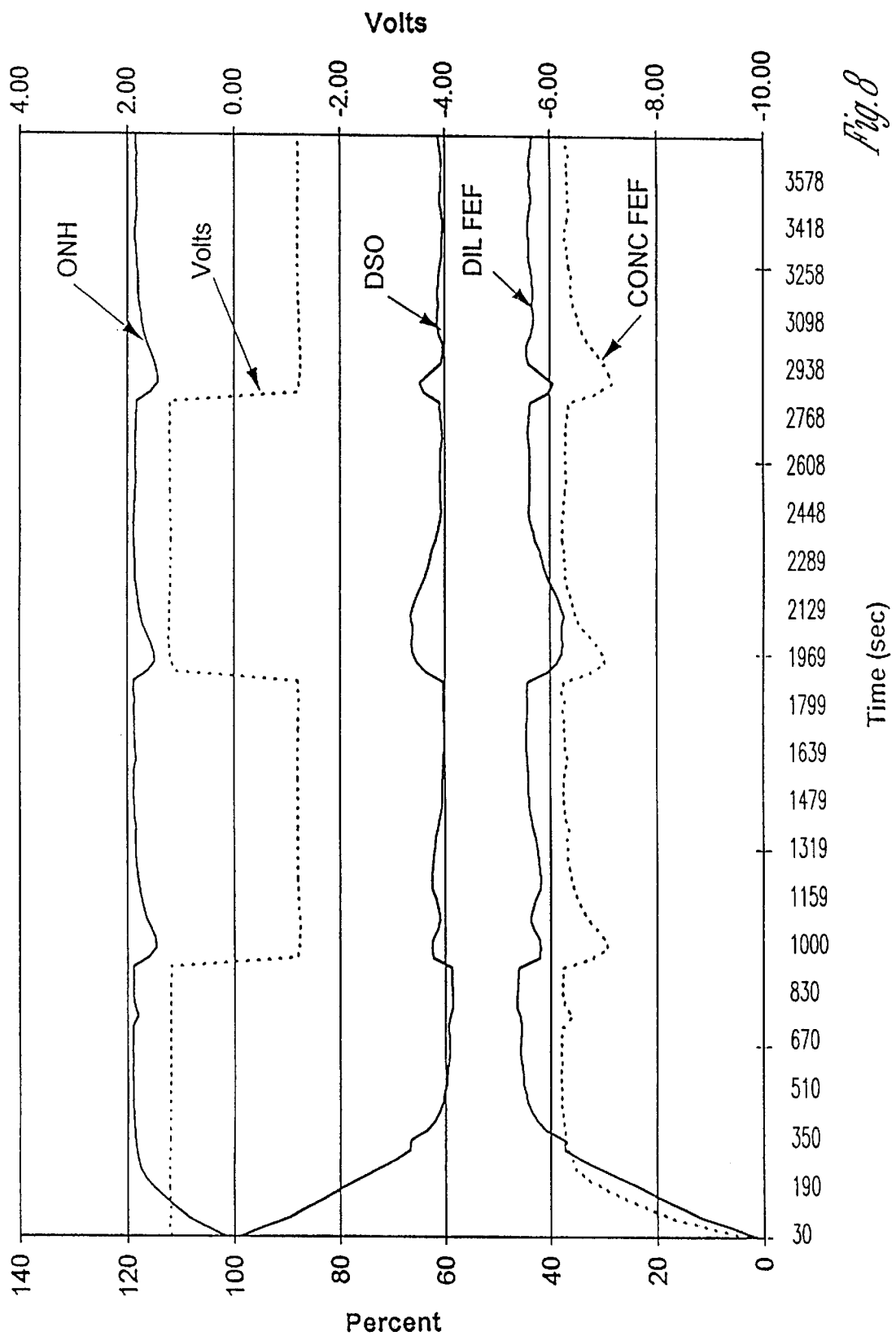
FIG. 8 is a dynamic desalination of 0.01M $CuSO_4$ in the ELCOR™ system operating in the electrolytic mode at a mean centrifugal force of 173 G. Other conditions are: process current=443 mA; diluent flow rate=30.5 mL/min; concentrate flow rate=54.6 mL/min; spin rate=1350 RPM.

The ELCOR™ module in this test was of the type depicted in FIGS. 2A to 2D2, inclusive. It utilized 3 cells, equipped with 4 annular copper electrodes connected in electrical series but with liquid flow in parallel. The ELCOR™ device used no external pumps; gravity flow was used for the feed and centrifugal ejection for the effluents, hence the rate of flow of the feed was equal to the sum of the rates of the effluents. The rate of flow could be controlled by the size of the effluent orifices. The test conditions were as follows. The rate of rotation was 1350 RPM which corresponds to a centrifugal force of 173 G (i. e., 173 times the force of gravity) at a mean radius of 8.51 cm. The flow rates of the diluent and of the concentrate were 30.5 and 54.6 mL/min, respectively. The average process current was 0.443 A (amps). The resulting average values of DSO and ONH were 62.0 and 117.8%, respectively, compared with 100% relative concentration for the feed. Thus, enhancement and deionization are approximately inversely proportional to the flow rates. Graphical data for this test in FIG. 8 show curves displayed during the run, including the "observed enhancement" (ONH), the "observed deionization" (DSO), and process voltage (Volts). The polarity of the latter changes periodically from positive to negative, which is a requirement to rendering the process continuous. The Faradaic efficiencies for the concentrate and the diluent are also shown, designated by CONC FEF and DIL FEF. In this figure note the dips in the observed values as well as in the calculated Faradaic efficiencies following the change in the polarity of the applied voltage.

The average Faradaic efficiencies for the diluent and the concentrate were 42.6 and 35.6%, for an average of 39.1%. The two former values should be the same as the average; in fact the difference is relatively small. Comparison of the data from this test with those for a similar test done at 875 RPM, corresponding to a centrifugal force of 73 G, at which average Faradaic efficiency of 29.1% was obtained, indicates a substantial increase in the Faradaic efficiency for the test done at higher RPM, as would be expected from the preceding static ELCOR™ tests.

Similar tests have been done with success on solutions having initial feed concentrations ranging from 0.05M down to 0.001M. In some of these tests sulfuric acid was added.

Examples E, F, G, and H.
Dynamic Deionization of Aqueous Sulfate Solutions of $Zn^{+2}$, $Cd^{+2}$, $Fe^{+2}$, and $Mn^{+2}$ in the ELCOR™ Device Tests similar to Example D have been made on aqueous sulfate solutions containing heavy metal ions of $Zn^{+2}$, $Cd^{+2}$, $Fe^{+2}$, and $Mn^{+2}$ in apparatus similar to that used in Example D. In these examples, however, the feed and the effluent fluids were delivered through the ports in the rotary union. Gravity feed was used in combination with metering pumps for the effluents. The concentrations of the solutions used were 0.01M and 0.001M of the sulfates. Sulfuric acid was added at a concentration equal to 1/10 of the metal ion concentration to suppress the formation of hydroxides and to promote electroplating. In all cases deionization was successfully demonstrated. For the 0.01M solutions the average Faradaic efficiencies were 23.3%, 27.8%, 25.3% and 29.2%, respectively. For the 0.01% solutions the Faradaic efficiencies were 25.7%, 9.3%, 8.8%, and 12.6%, respectively.

Example I.
Separation of $CuSO_4$ from a Solution of $CuSO_4$—$ZnSO_4$—$H_2SO_4$.

This experiment was designed to demonstrate the capability of separating individual metal salts from a complex mixture. The concentrations of the solutes in the $CuSO_4$—$ZnSO_4$—$H_2SO_4$ feed were 0.005M—0.005M—0.001M, respectively. The diluent and the concentrate flow rates were 76.7 and 79.0 mL/min., respectively, and the process current was 0.532 A. The values for the relative concentrations for deionization (DSO) and enhancement (ONH) were 70% and 125%, respectively and the average Faradaic efficiency was 26.6%. Analytical results based on atomic absorption spectroscopy, obtained for the diluents, indicated that the deionization and enhancement involved only copper. Therefore, the experiment was successful. The (partial) separation of the two metals has been accomplished on the basis of the difference in their reduction potentials.

Examples of demineralization in the electrostatic mode are as follows.

Example J.
Deionization of simple ionic solutions including KCl, NaCl, $NaNO_3$, $NaHCO_3$, $MgSO_4$, $CaCl_2$ and $H_2SO_4$ by electrogravitation in the electrostatic mode.

Figure 9:
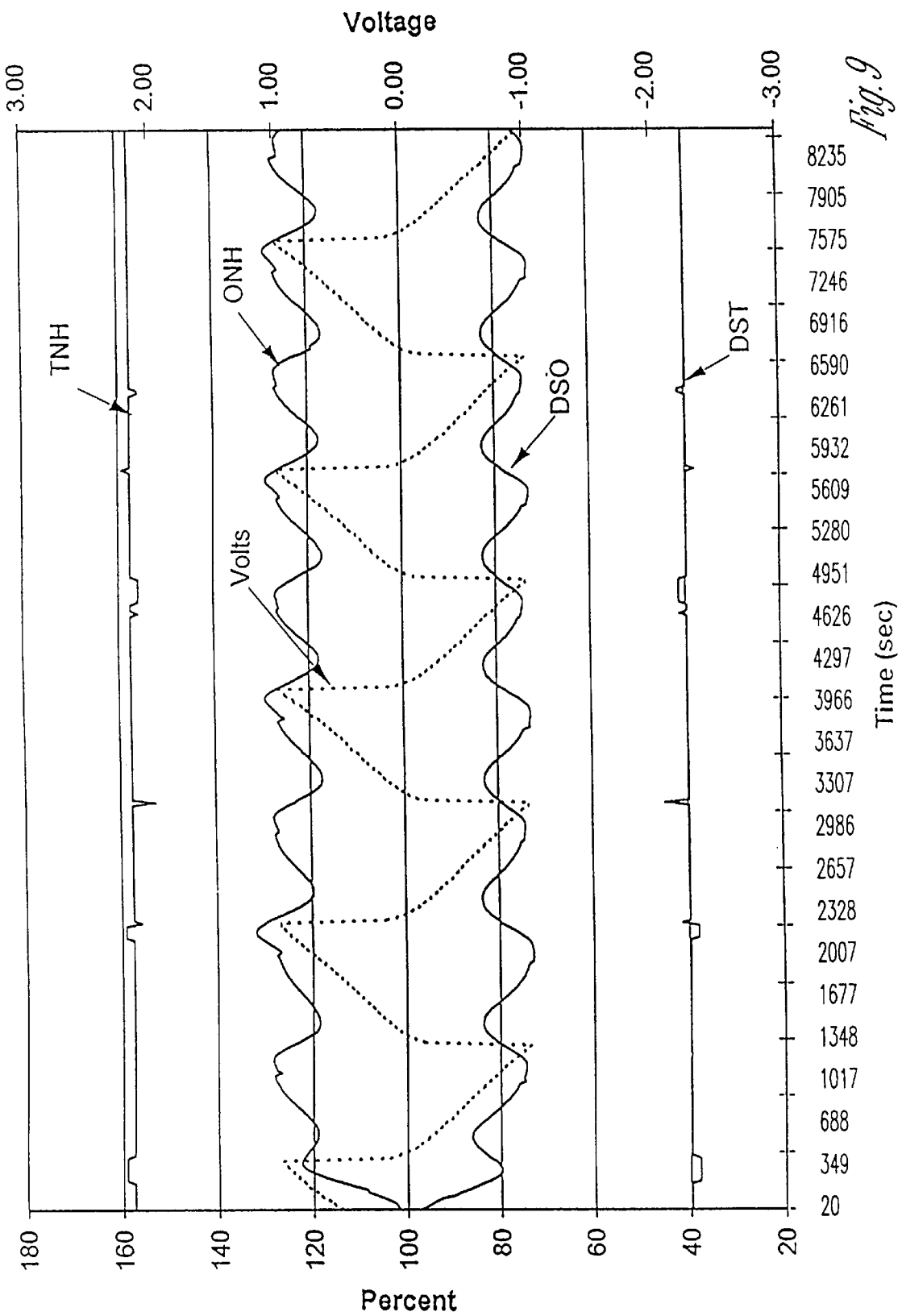
FIG. 9 is a dynamic EG deionization of 0.01M $CaCl_2$ in the electrostatic mode utilizing reversible high-surface-area electrodes. Other conditions are: process current=35 mA; maximum process voltage ($V_{max}$)=1.0 Volt; diluent flow rate=1.85 mL/min; concentrate flow rate=1.85 mL/min.
Figure 10:
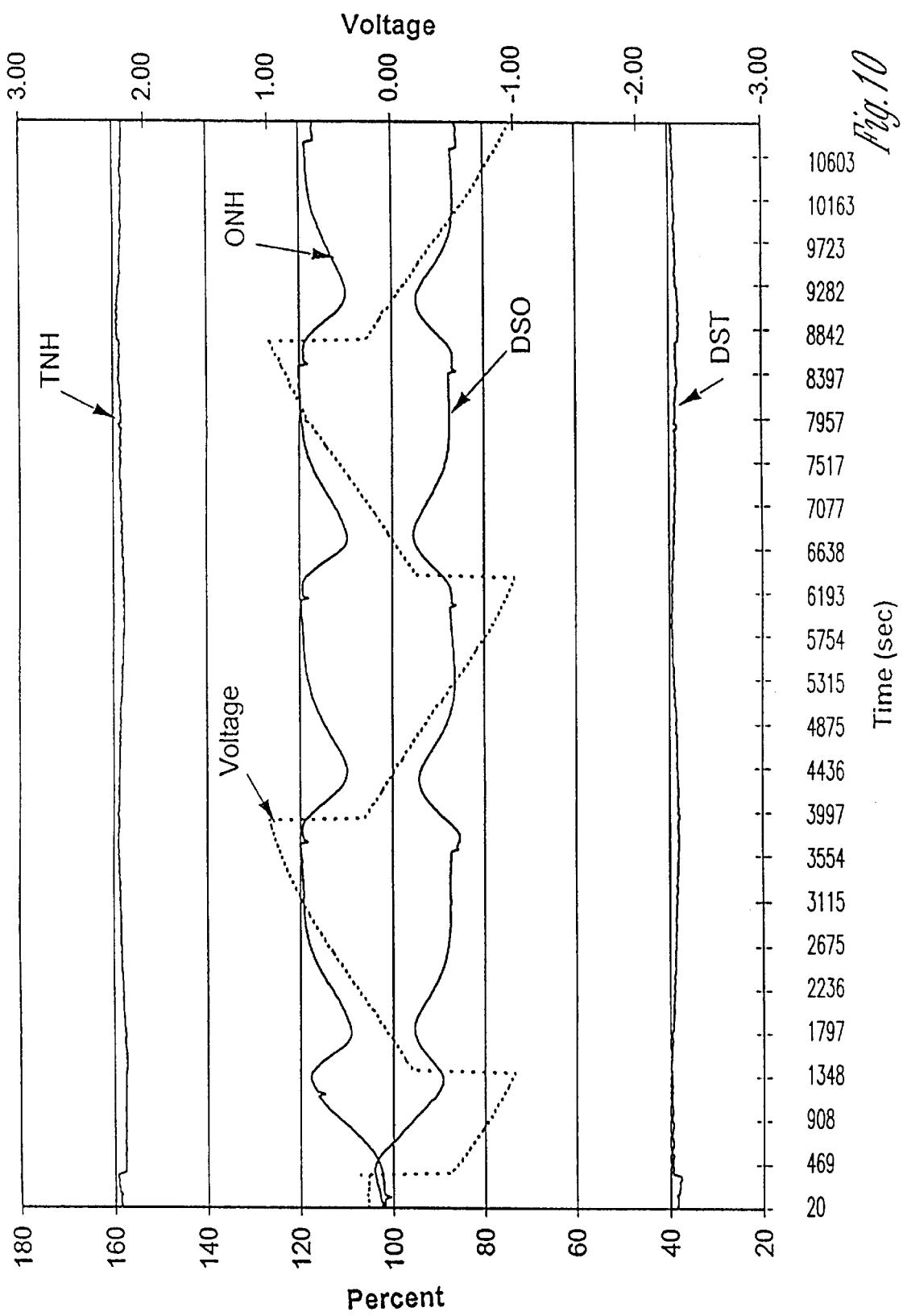
FIG. 10 is a dynamic EG deionization of 0.01M $H_2SO_4$ in the elecirostatic mode utilizing reversible high-surface-area electrodes. Other conditions are: process current=35 mA; $V_{max}$=1.0 Volt; diluent flow rate=1.85 mL/min; concentrate flow rate=1.85 mL/min.

Deionization experiments were performed in an EG cell using HSA electrodes on representative dissolved salts normally found in brackish well waters. The single-cell EG device described above, operating in dynamic, electrostatic mode was used. Deionization has been demonstrated for six different salts containing ions that are prevalent in brackish well waters, including KCl, NaCl, $NaNO_3$, $NaHCO_3$, $MgSO_4$, $CaCl_2$ and for sulfuric acid at starting concentrations of 0.1 molar (M) to 0.001M. The performance data are shown in Table 1 for solutions having concentration of 0.01M where a process current of 35 mA was used. Examples of deionization are also shown in FIGS. 9, and 10 for $CaCl_2$, and $H_2SO_4$, respectively.

The observed deionization (DSO) ranged from 83.4% up to 58.1% for the monovalent salts and from 85.0% to 77.8% for the divalent salts. The enhancement (ONH) data ranged from 130.1% to 142.8% for the monovalent species and from 119.2% to 122.9% for divalent salts. The Faradaic efficiency, which should not be affected by valence, ranged from 25.9% to 39.9% and had an average value of 32.7% for enhancement. Faradaic efficiency ranged from 13.6% to 36.6% and had an average value of 27.5% for DSO. At this concentration level pH changes have also been observed which are thought to affect conductivity measurements and thereby the apparent asymmetry in Faradaic efficiency. The average value of Faradaic efficiency for and enhancement for all six salts is 30.1%, which is noticeably higher than for the electrolytic mode. At this level of concentration the computed costs of concentrating the salts for possible recovery range from 0.8 to 3.3 cents per pound. For the deionization of water the costs range from 2.1 to 6.1 cents and having an average of 3.8 cents per 1000 liters!

TABLE 1

Averaged performance characteristics of the dynamic deionization cell operating in the electrogravitational electrostatic mode, utilizing reversible HSA electrodes for KCl, NaCl, $NaNO_3$, $NaHCO_3$, $MgSO_4$, $CaCl_2$, and $H_2SO_4$ at a concentration of 0.01M and at a constant, average current of 35 mA

| Test Number | ELEC | DSO (%) | ONH (%) | FEFD (%) | FEFC (%) | COSTCP ($/lb) | COSTW ($/m3) |
|---|---|---|---|---|---|---|---|
| CM-1 | KCl | 69.9 | 132.0 | 25.2 | 28.2 | 0.017 | 0.028 |
| CM-2 | NaCl | 58.1 | 142.8 | 34.8 | 37.4 | 0.016 | 0.021 |
| CM-3 | $NaNO_3$ | 61.9 | 137.3 | 29.8 | 30.7 | 0.008 | 0.023 |
| CM-4 | $NaHCO_3$ | 83.4 | 130.1 | 13.6 | 25.6 | 0.033 | 0.054 |
| CM-5 | $MgSO_4$ | 85.0 | 119.2 | 25.0 | 33.6 | 0.011 | 0.061 |
| CM-6 | $CaCl_2$ | 77.8 | 122.9 | 36.6 | 39.9 | 0.008 | 0.040 |
| CM-7 | $H_2SO_4$ | 89.4 | 116.2 | 17.3 | 27.9 | 0.014 | 0.060 |

This system apparently undergoes complex chemical changes which involve not only the starting ionic species of $Na^+$ and $HCO_3^-$, but also $CO_3^{-2}$, dissolved $CO_2$, $H_2CO_3$, and the hydronium and the hydroxyl ions. This interesting behavior is reflected in the deionization of well waters containing significant amounts of the bicarbonate ion. From these results indications are that the electrostatic mode is applicable to the deionization of most ionic species.

For sulfuric acid the Faradaic efficiency is lower for the higher concentration than for most of the salts, however it is slightly higher than that of $NaHCO_3$. The cost data are also favorable and comparable with the salts. The ability to demineralize solutions containing acids raises the possibility of neutralizing acid rain water in reservoirs without the addition of chemicals such as lime.

Example K.

Deionization of Brackish Iowa Well Water in the Electrostatic Mode

Figure 11:
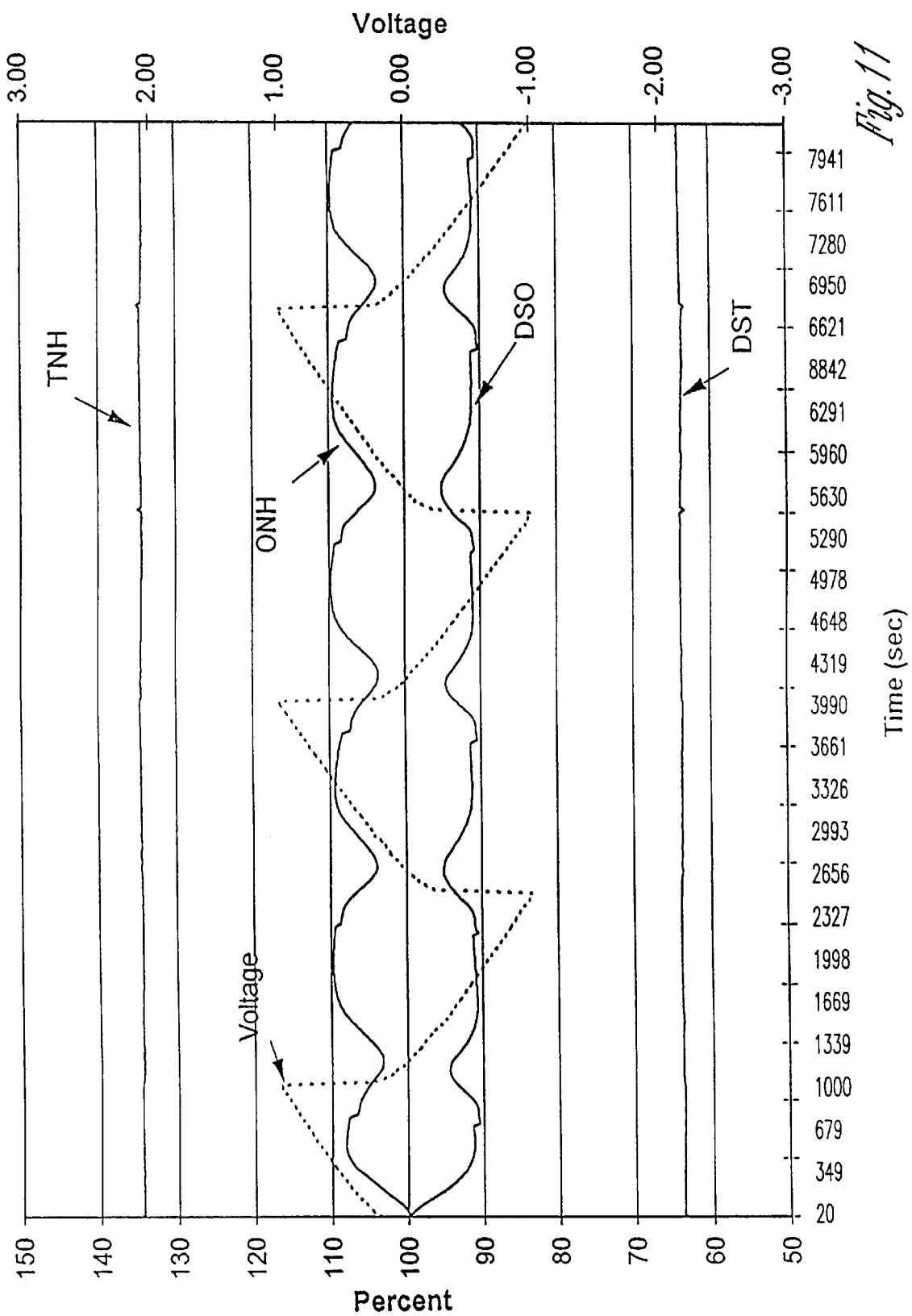
FIG. 11 is a dynamic EG deionization of brackish well water from Hull, Iowa, in the electrostatic mode utilizing reversible high-surface-area electrodes. Other conditions are: process current=32 mA; $V_{max}$=1.0 Volt; diluent flow rate=1.85 mL/min; concentrate flow rate=1.85 mL/min.

The well water samples from Hull, Iowa and from Davis City, Iowa were tested at conditions approximating the 0.01M liquids. The tests were done at a current of 32 mA. The summary of the deionization performance is shown in Table 2. As shown in FIG. 11 the Hull, Iowa water had nearly symmetrical deionization characteristics that resembled those of sulfuric acid. The sulfate content of this water was 1500 mg/L. The Hull water also contains large quantities of calcium (320 mg/L) which has good deionization characteristics.

TABLE 2

Averaged performance characteristics of the dynamic deionization operating in the electrostatic mode, utilizing reversible high-surface-area electrodes for brackish well water from Davis City, IA and Hull, IA

| Test | CITY | AVIP (mA) | DSO (%) | ONH (%) | FEFD (%) | FEFC (%) | COSTCP ($/lb) | COSTW ($/m3) |
|---|---|---|---|---|---|---|---|---|
| CM-8 | Davis | 32 | 98.6 | 108.8 | 5.2 | 36.2 | 0.036 | 0.383 |
| CM-9 | Hull | 32 | 92.1 | 107.4 | 22.0 | 21.8 | 0.012 | 0.090 |

Because the ELCOR™ process makes use of rotating machinery, the capital costs will be moderately higher than for reverse osmosis (RO) and electrodialysis (ED). However the difference in capital cost differences will diminish with increasing equipment size. Commercial centrifuges for waste-water treatment are now available in a wide range of sizes (e. g., from Humboldt Wedag, Northcross, Ga.). Such centrifuges could be adapted to ELCOR™ mobile units to produce potable water at a rate of over 1.5 million gallons per day. Smaller units would be suitable for large-size farm operations. The largest unit would be suitable for supplying water for a community of 10,000 inhabitants. The ELCOR™ process is expected to be competitive with the RO and ED processes chiefly because of the elimination of membrane replacement and down time and higher energy efficiency. Based on previous results, ELCOR™ is expected to be more energy efficient than ED and RO for brackish water containing up to 5000 ppm TDS. ELCOR™ should also find applications in the federal government for potable water production for the Armed Forces and in foreign countries such as Australia, where much of the water available inland is brackish. The potential economic benefit of ELCOR™ compared with initial investment is significant. As an example, lowering of the cost of desalinated water by merely 5 cents per 1000 gallons will save $182,500 per year for a community of 100,000.

Other anticipated commercial applications of ELCOR™ include the treatment of toxic and radioactive wastes and the recovery of valuable materials from mining and industrial wastes. Toward this goal the separation of copper been already demonstrated. Other future applications are in the purification of agricultural products, recovery of useful organic and biological compounds from agricultural products and the production of ethanol fuel from waste wood and plants. The benefits stemming from these applications may be an increase in industrial and agricultural competitiveness and in the creation of new jobs. Farmer U.S. Pat. No. 5,425,858 and some of the other cited prior art list or suggest a number of applications for separation of ionizable substances from liquids. Farmer at page 7, lines 38 to page 8 line 59 goes into substantial detail listing such applications. The present invention can be used for those applications as well as others, such as are known to or within the skill of those skilled in the art.

It is to be understood that various performance parameters of the embodiments of the invention can be monitored and calculated and are known to or within the skill of those skilled in the art. With respect to the embodiments described herein, performance data was, for example, based on the starting concentration of the feed, the observed concentrations of the effluents and other dependent and independent process variables. Concentrations can be determined conductometrically for the expression $$\log C = a \log K + b$$

where C is the concentration of the solute in a given fluid, K is the conductivity and a and b are constants determined for each material separately by calibration. A temperature correction to a common temperature is required for each data point. The performance parameters which will be determined are defined below or elsewhere in this description.

Observed Relative concentration—This parameter is approximately equal to the C/Co ratio of the observed (C) and the initial (Co) concentrations of a given fluid. For the depleted fluid (diluent) this parameter is referred to as the "Observed Relative Deionization" (DSO), expressed in % and its value ranges between less than 100% and more than 0%. For the concentrate, this parameter is referred to as "Observed Relative Enhancement" (ONH), also expressed in % and its value is greater than 100%.

Theoretical Relative Deionization (DST) and Theoretical Relative Enhancement (TNH)—These parameters are the relative concentrations of the diluent and the concentrate, respectively. Their values are determined from the process current and are based on the process operation at 100% Faradaic efficiency. In some cases the observed and the theoretical relative concentrations are plotted side-by-side on the computer screen in real time to obtain a visual confirmation of deionization and of process performance.

Separation Ratio—This parameter is the ratio of the observed concentrations of the diluent and of the concentrate (or of the relative concentrations of the diluent and of the concentrate).

Separation Rate—A practical parameter that gives the rate of separation of the solute from the feed liquid in terms of mass or percent per unit of time. It is computed from the actual concentration of the feed and the effluents and their flow rates.

Faradaic Efficiency (FEF)—This parameter is based on the quantitative relationship between the amount of material electrolyzed and the charge transported (1 Faraday=96,485 coulombs per gram-equivalent). The ratio of the observed and theoretical relative concentrations times 100 is the Faradaic efficiency in %. FEFD and FEFC refer to the FEF for the diluent and the concentrate, respectively.

Energy Efficiency—In this work it is expressed as the mass of the solute compound removed from the feed liquid per unit of electrical energy (e.g., kg/kWh). The energy used is only the energy used in the electrolytic process. For commercial ELCOR™ devices all sources of energy consumption must be included.

Cost per Unit Mass (COSTCP)—Cost of the solute removal per unit of mass (e.g. $/kg) is the ratio of the cost of energy ($/kWh) and of the energy efficiency (kg/kWh).

Cost per Volume (COSTW)—The cost of water treatment per volume of water ($/cubic meter) is determined by converting the mass of solute to the corresponding volume of water in the preceding cost per mass. Both of the cost parameters are important indicators of the economic feasibility of the ECS process.

REFERENCES

1. U.S. Department of Energy, Environmental Restoration and Waste Management Five-Year Plan, Fiscal years 1994–1998, Report No. DOE/S-00097P, Vol. 1, January 1993.
2. U.S. Department of Energy, Office of Technology Development, Fiscal Year 1993, "Program Mid-Year Summaries Research, Development, Demonstration, Testing and Evaluation, October, 1993.
3. Grosse, D. W. "Treatment Technologies for Hazardous Wastes: Part IV. A Review of Alternative Treatment Processes for Metal Bearing Hazardous Waste Streams, " Journal of the Air Pollution Control Association, 36(5):603–614 (1986). (ISSN No. 0002-2470.)
4. Peters, Robert W. and Young Ku, in Separation of Heavy Metals and Other Trace Contaminants, Robert W. Peters and B. Mo Kim, eds., Amer. Inst. of Chem. Engineers, Symposium Series 243, Vol. 81, p. 165 (1985).
5. Freeman, Harry M., Standard Handbook of Hazardous Waste Treatment and Disposal, editor, U.S. Environmental Protection Agency, McGraw-Hill Book Company, New York (1989).
6. Evaluation of Management Practices for Mine Solid Waste Storage, Disposal, and Treatment, Vol. 2, prepared by PEI Associates, Inc. Cincinnati, Ohio. (formerly PEDCo Environmental, Inc.) for the U.S. EPA Office of Research and Development, Cincinnati, Ohio, (1983).
7. Brooks, Clyde C., Metal Recovery from Industrial Waste, Lewis Publishers, Inc., Chelsea, Mich. (1991).
8. Aguwa, Aloysius, A. and Charles N. Haas, "Electrolytic Recovery Techniques," in Ref. 3. p. 6.39.
9. Pemsler, J. P. and A. S. Rappas, "Metal Recovery from Solutions by Selective Reduction of Metal Ions," pp. 135–158, in Recent Developments in Separation Science, Vol. 5, N. N. Li, ed., CRS Press, West Palm Beach, Fla., (1979).
10. Benirati, C. A. and W. J. McLay, "Electrolytic Metal Recovery Comes of Age," Plating and Surface Finishing, March 1983, p. 26.
11. Farkas, J., and G. D. Mitchell, in Ref 17, p. 57.
12. Campbell, M. E. and W. M. Glenn, A Guide to Industrial Waste Reduction and Recycling, Pollution Probe Foundation, Toronto, Canada (1982).
13. U.S. Environmental Protection Agency, Development Document for Existing Sourced Pretreatment Standards for the Electroplating Point Source Category, EPA 440/1-79/003, Wash., D. C., August 1979, p. 204.
14. Robertson, P. M. J. Leudolph, and H. Maurer, "Improvements in Rinsewater Treatment by Electrolysis," in Plating and Surface Finishing, Oct. 1983, p. 521.
15. Bier, Milan, Electrophoresis: Theory, Methods and Applications, Academic Press (1967).
16. Frilette, Vincent, J., J. Phys. Chem. 61, 168–174 (1957).
17. Murphy, George W., J. Electrochem. Soc. 97, 405–413 (1950).
18. Kollsman, Paul, U.S. Pat. No. 2,854,393, Sep. 30, 1958; Kollsman, Paul, U.S. Pat. No. 3,099,615, Jul. 30, 1963.
19. Nellen, William Joseph, U.S. Pat. No. 3,335,079, Aug. 8, 1967.
20. Brown, J. H. and D. G. Conning, U.S. Pat. No. 3,349,021 (1967).
21. Shaffer, L. H. and M. S. Mintz, in Principles of Desalination, Second Edition, Part A, K. S. Spiegler and A. D. K. Laird, Editors, Academic Press, 263–354 (1980).
22. Reimann, Hanno, German Patent 41 41 345 Al, Jun. 17, 1993.
23. P. M. Wild and G. W. Vickers, "The Technical and Economic Benefits of Centrifugal Reverse Osmosis Desalination," Desalination 89, 33–40 (1992).
24. Schwerin, B., U.S. Pat. No. 1,230,524, Jun. 19, 1917.
25. Marx, A., U.S. Pat. No. 1,558,382, Oct. 20, 1925.
26. Anderson, N. G., U.S. Pat. No. 3,556,967, Jan. 19, 1971.
27. Gazda, Hans Otto Ernst and Krigerg, Anton, U.S. Pat. No. 4,008,135, Feb. 15, 1977.
28. Wadsworth, L. H., U.S. Pat. No. 3,196,095, Jul. 20, 1965.
29a. Y. Oren and A. Soffer, "Electrochemical Parametric Pumping," J. Electrochem. Soc.: Electrochemical Science and Technology 125, 869–875 (1978).
29b. Y. Oren and A. Soffer, "Water desalting by means of electrochemical parametric pumping. I. The equilibrium properties of a batch unit cell," Journal of Applied Electrochemistry 13, 473–487 (1983).
29c. Y. Oren and A. Soffer, "Water desalting by means of electrochemical parametric pumping. II. Separation properties of a multistage column," , Journal of Applied Electrochemistry 13, 489–505 (1983).
30. "SDI 'Supercapacitors' to See Civilian Applications," edited by P. Hamilton, Science 255, 787, Feb. 1992.
31. Conway, B. E., "Transition from 'Supercapacitor' to 'Battery'Behavior in Electrochernical Energy Storage," J. Electrochem. Soc. 138, No. 6, 1539 (1991).
32. Koresh J. and A. Soffer, Double Layer Capacitance and Charging Rate of Ultramicroporous Carbon Electrodes," ibid., 124, No. 9, 1379 (1977).
33. Tanahashi Ichiro, A. Yoshida and A. Nishino, "Electrochemical Characterization of Activated Carbon-Fiber Cloth Polarizable Electrodes for Electric Double-Layer Capacitors," ibid., 137, No. 10, 3052 (1990).
34. Gagnon, E. G. "The Triangular Voltage Sweep Method for Determining Double-Layer Capacity of Porous Electrodes," ibid., 122, No. 4, 521 (1975).
35. "Laboratory Deionization Technology May Herald Low Cost Sea Water Desalination and Waste-water treatment," News Release, Lawrence Livermore National Laboratory, Dec. 20, 1994.
36. Farmer, Joseph, U.S. Pat. No. 5,425,858, Jun. 20, 1995.
37. Tong, Robert, et al. U.S. Pat. No. 5,384,685, Jan. 24, 1995.
38. Tong, Robert R., et al. U.S. Pat. No. 5,464,453, Nov. 7, 1995.

What is claimed is:

1. A rotary electrolytic apparatus for separation of ionizable substances from liquid solutions by the combined action of electric current passing through a liquid solution and of compound centrifugal force, also known as Coriolis force, whereby the liquid solution treated is separated in the form of a concentrated solution of solute and of a depleted solution containing mainly solvent, comprising:

a container having an axis of rotation and having a connection to operatively connect the container to a source of rotational power;

one or more sets of electrodes, each set forming an electrolytic cell and positioned in the container in a manner that allows rotation of the set about the axis of rotation, the electrodes of each set being spaced apart along the axis of rotation and including insulating and sealing spacers between electrodes at or near the perimeter and center of each electrode, the electrodes and spacers defining a space therebetween which functions as an electrolytic cell;

a fluid inlet to each cell to supply the liquid solution to be treated from a feed fluid source;

an electrical connection to one electrode of a set of said electrodes to connect said one electrode to a source of electrical current;

a concentrated solution outlet in each cell positioned at a location in the cell that corresponds with an accumulation of concentrated solution caused by Coriolis force during rotation of the container; and a depleted solution outlet in each cell positioned at a location in the cell that corresponds with an accumulation of depleted solution caused by Coriolis force during rotation of the container.

2. The apparatus of claim 1 wherein each cell has a bar extending radially and sealingly through the cell, the bar having a leading side pointed opposite to the direction of the rotation of the cell and a trailing side pointed in the positioned near the inner periphery of the cell and near the trailing side of the bar, and the concentrated solution outlet is located toward the outer periphery of the cell and near the trailing side of the bar, and the depleted solution outlet is located toward the inner periphery of the cell and near the leading side of the bar.

3. The apparatus of claim 2 wherein the electrodes are connected in electrical series by conduction of electricity through the liquid solution from electrode to electrode but the liquid solution is introduced and removed in parallel from each cell defined by each set of electrodes.

4. The apparatus of claim 1 wherein the electrodes are generally planar and annular, and are generally centered on and perpendicular to the axis of rotation.

5. The apparatus of claim 1 further comprising an electrical power source which delivers d.c. electrical power to the electrical connection.

6. The apparatus of claim 5 including an electrical current control operatively connected to the electrical power source to reverse polarity of the electrodes after a designated time interval.

7. The apparatus of claim 6 wherein the designated time interval is a function of the thickness of the plating which occurs at the electrodes which in turn is a function of current density and time.

8. The apparatus of claim 5 including electrical current control components operatively connected to the electrical power source to reverse polarity of the electrodes after a designated voltage is reached.

9. The apparatus of claim 8 wherein the designated voltage is a function of magnitude of double-layer capacitive charge acquired by the electrodes, which in turn is a function of real surface area of the electrodes and current density used in the electrostatic deionization process.

10. The apparatus of claim 1 wherein the electrodes have a textured or porous surface to promote adhesion of electroplated material for operation in the electrolytic mode.

11. The apparatus of claim 1 wherein the electrodes have a real or wet surface area higher than the apparent geometric area for operation in the electrostatic mode.

12. The apparatus of claim 11 wherein the ratio of real or wet surface area to apparent geometric area is at least 1,000.

13. The apparatus of claim 1 wherein the fluid being processed is selected from the group consisting of water for human use including drinking, washing, and cooking, water for farm production including irrigation, aqua culture and watering of animals, water for industrial production including semiconductor processing, surface waste water, brackish or sea water, liquids with heavy metal ions and toxic anions including those that are present in mine waste-water and in industrial waste-water streams, liquids with radioactive nuclides to facilitate their safe storage, liquids with dissolved acids and bases, the separation and concentration of which can facilitate the recovery of purified water and concentrated acids and bases, liquids with dissolved ionizable solute in a liquid form to facilitate recovery of valuable components or the disposal of hazardous substances including non-oxidizable organic and inorganic anions or non-reducible and reducible cations, and valuable products from whey, including lactic or folic acids.

14. The apparatus of claim 1 further comprising concentric chambers positioned radially around the perimeter of the cells, the concentric chambers including one or more sets of concentric electrodes, each set of concentric electrodes defining an electrolytic cell.

15. The apparatus of claim 1 wherein desired minimal spacing between electrodes increases with at least the width of the electrodes in a radial direction and with departure from flatness of the electrode surfaces and wherein spacing between the surfaces of opposing electrodes is between about 0.005 cm and 1.0 cm.

16. The apparatus of claim 1 further comprising sensors for continuously monitoring the process, the sensors being selected from the group consisting of voltage probes, conductivity electrodes, pH cells, nuclear radiation probes, and flow rate cells.

17. The apparatus of claim 16 further comprising an automated means of process monitoring and control, the automated means comprising one or more devices selected from the group consisting of a conductivity meter, pH meter, ammeter, voltmeter, flow rate monitor, nuclear radiation monitor, a data acquisition system and a microcomputer.

18. The apparatus of claim 1 wherein the process is continuous, and wherein the liquid solution to be processed is continuously fed in and the concentrated and depleted solutions continuously removed.

19. The apparatus of claim 1, wherein concentration and the depletion of the dissolved ionizable solute take place by means of a reversible electrolytic reaction.

20. The apparatus of claim 1 wherein concentration and the depletion of the dissolved ionizable solute take place by means of a reversible capacitive charging process at a voltage less than the oxidation-reduction potential of the ionic species present in the solute.

21. The apparatus of claim 1 wherein the electrodes are made of activated carbon.

22. The apparatus of claim 1 wherein each electrode comprises an essentially flat, metallic, supporting sheet selected from titanium, zirconium, iron, copper, stainless steel or combinations thereof, said metallic supporting sheet having a thickness of 0.005 cm to 0.05 cm and coated on each flat surface which faces another electrode, with an electrically conductive layer of one of carbon or at least one metal oxide having a porous high specific surface area independently selected from metal oxides of the group consisting of the transition metals in groups 4 to 10 in the Periodic Chart of the Elements (new IUPAC notation) and the lanthanides, wherein the thin carbon or metal oxide coatings has a thickness between about 0.1 and 100 microns and a specific area in excess of 300 meter$^2$ per gram; said electrode being suitable for deionization in the electrostatic mode.

23. The apparatus of claim 1 wherein each electrode comprises a supporting sheet of titanium metal 0.025 cm thick and having high specific surface area coatings on each side comprising a mixed metal oxide coating of ruthenium and tantalum oxides in equal molar ratios, said electrode being suitable for deionization in the electrostatic mode.

24. The apparatus of claim 1 wherein each electrode comprises a material generally used in supercapacitors or ultracapacitors including a porous coating having a specific surface area in excess of 300 meter$^2$ per gram, said electrode being suitable for deionization in the electrostatic mode.

25. The apparatus of claim 1 wherein each process electrode comprises an essentially flat, metallic, sheet selected from titanium, zirconium, iron, silver, copper, stainless steel or combinations thereof, having a thickness of 0.005 to 0.025 inches, and having a porous or a textured surface to increase the specific surface area and to promote the adhesion of electroplated metals; said electrode being suitable for deionization in the electrolytic mode.

26. A method for a continuous separation of ionizable substances from liquid solution into a concentrated solution of solute and of a depleted solution containing mainly solvent comprising the steps of:
   continuously feeding said liquid solution into a rotatable chamber containing one or a plurality of electrolytic cells, capable of separation of ionizable substances from liquid solutions by the combined action of electric current passing through the liquid solution and of Coriolis force;
   rotating said chamber to create centrifugal force greater than two times the magnitude of the gravitational force;
   establishing a d.c. current flow through said cell or cells;
   periodically changing the polarity of the current to facilitate a continuous operation;
   separately and continuously discharging the concentrated and depleted solutions; and
   controlling the process by monitoring of process parameters including the voltage, current, and the flow rates, temperature and the ionic concentration of the solutions.

27. The method of claim 26 by a reversible capacitive charging process at a voltage less than the oxidation-reduction potential of an ionic species present in the solute or that of the solvent.

28. The method of claim 26 by means of a reversible electrolytic process utilizing the apparatus of claim 1.

29. The method of claim 26 further comprising a scalable water-treatment process suitable for the treatment of water containing elevated concentrations of ionizable solutes to recover water suitable for reuse, including water for drinking, water for farm production including irrigation and watering of animals, and for industrial production.

30. The method of claim 26 further comprising a water-treatment process suitable for concentrating the dissolved ionizable solute in a liquid form to facilitate recovery of valuable components or the disposal of hazardous substances.

31. The method of claim 26 further comprising a water-treatment process suitable for demineralization of natural brackish water and sea water.

32. The method of claim 26 further comprising a water-treatment process suitable for the separation of heavy metal ions and toxic anions present in mine waste water and in industrial waste-water streams.

33. The method of claim 26 further comprising a water-treatment process suitable for the separation and concentration of ionizable radioactive nuclides to facilitate their safe storage.

34. The method of claim 26 further comprising a water-treatment process suitable for the separation and concentration of dissolved acids and the recovery of purified water and concentrated acids.

35. The method of claim 26 wherein the solvent is water.

36. A method for a continuous separation of ionizable substances from liquid solutions into concentrated and depleted solutions comprising the steps of continuously feeding said liquid solution into a rotatable chamber containing one or a plurality of electrolytic cells capable of separation of ionizable substances from a liquid solution by the combined action of electric current passing through the solution and of centrifugal force; rotating said chamber to create centrifugal force greater than two times the magnitude of the gravitational force; establishing a d.c. current flow through said cell or cells; separately and continuously discharging the concentrated and depleted solutions, controlling the process by monitoring of process parameters including the voltage, current, and the flow rates, temperature and the ionic concentration of the liquids; the improvement comprising:
   performing the deionization of the liquid solution in a rotatable cylindrical deionization apparatus that takes advantage of the Coriolis force in the deionization process;
   performing the deionization with the cells arranged in electrical series, thereby circumventing problems with a high current operation;
   periodically changing the polarity of the current to facilitate a continuous operation;
   conducting the deionization utilizing automated monitoring and control provisions, leading to improved quality control and low labor costs;
   conducting deionization either in the electrolytic mode that enables the separation of individual platable metal ions from a complex solution or conducting deionization in the electrostatic mode that enables the removal of most ionic species from simple or complex solutions.

37. An apparatus for removing ionizable substances from fluids comprising:
   a container having a rotational axis;
   one or more annular chambers in the container, each chamber having a first wall and a second wall;
   the first wall comprising an electrode and the second wall comprising an electrode of opposite polarity to the electrode of the first wall;
   a radial wall extending through each chamber;
   at least one inlet into each chamber to supply on a continuous basis feed fluid to the chamber;
   a first outlet from each chamber positioned to remove portions of the feed fluid that have been separated by electromigration and Coriolis force;
   a second outlet from each chamber positioned to remove remaining portions of the feed fluid; and
   the first outlet placed along the outer perimeter of the chamber, the second outlet placed along the inner portion of the chamber.

38. A method of removing ionizable substances from fluids comprising:
   feeding a feed fluid comprising a solution which contains said ionizable substances dispersed throughout said solution between two electrodes;
   causing electrical current to flow from one electrode through the feed fluid, and to the other electrode;
   imparting centrifugal force and motion, centered about an axis of rotation, to the feed fluid;
   causing electromigration of ionizable components towards said electrodes;

at intervals of time reversing the polarity of the electrodes;

utilizing compound centrifugal force and motion on the feed fluid to cause separation of denser components from less dense components;

removing the denser components to a separate place; and removing the less dense components to a separate place.

39. A rotary apparatus for continuous separation of ionizable substances from liquid solutions to form a concentrated solution containing the solute and of a depleted solution containing mainly the solvent, said apparatus comprising a cylindrical, rotatable deionization chamber containing two or more electrodes electrically insulated from each other, each adjacent pair of said electrodes forming an electrolytic cell in between; a motor for rotating said chamber to produce centrifugal force substantially greater than gravitational force; a means of feeding and metering of said liquid solution and a means of exhausting the concentrated and the depleted liquids; a means of delivering a d.c. electrical current to flow through the cells; a means of periodically changing the polarity of said current; said apparatus comprising;

(a) a deionization chamber comprising (a1) an enclosure consisting of outer and inner cylindrical members and two annular end plates, the inner surfaces of said chamber being electrically insulating;

(a2) two or more planar, annular electrodes, mounted coaxially with the deionization chamber, equidistantly from each other and with their planes perpendicular to the axis of rotation of the chamber; said electrodes having a specific surface area higher than the apparent geometric area, and adjacent electrodes being separated from each other by electrically insulating and fluid sealing ring spacers located at the outer and inner peripheries and by a radially-disposed bar spacer touching said rings, that provides a radial wall inside the cell compartment to define front and rear ends of the cell compartment;

(b) a pair of electrical current leads and a pair of voltage probe leads, communicated to the deionization chamber via a slip-ring assembly and being attached to the first and to the last electrodes mounted on the inner side of the end plates of the chamber, whereby in the case of two or a plurality of cells in the electrode assembly, the cells are arranged in electrical series, thereby minimizing the process current and circumventing the need for extra hardware for contacting the rest of the electrodes that would be required for cells interconnected in parallel; wherein during operation, the first and the last electrodes, each having only one side facing another electrode, acquire charges of opposite polarity; upon polarity reversal the electrode polarities are reversed; and all intermediate electrodes assume positive polarity on one side and negative polarity on the other side and vice versa upon polarity reversal by the power supply; and (c) said electrodes having orifices for communicating the feed and the effluent liquids into and out of the cell compartments and the chamber;

(d) said electrodes and cell compartments and feed and effluent orifices are axially and radially co-aligned, and in order to take advantage of the beneficial effects of the Coriolis forces in the deionization process, said feed and effluent orifices of the electrodes are situated as follows: for the feed liquid—in the general proximity of the rear of the electrode compartment and adjacent to its inner periphery; for the concentrate liquid—adjacent to the rear of the electrode compartment and to its outer periphery; for the diluent liquid—adjacent to the front of the electrode compartment and to its inner periphery.

40. The method of claim 39 wherein the feed and effluent liquids are supplied or discharged via a rotary union.

41. The method of claim 39 wherein the feed and the diluent liquids are supplied via a rotary union and the concentrate liquid is discharged centrifugally through an orifice situated in the wall of the deionization chamber at or near its outer periphery.

42. The method of claim 39 wherein the feed liquid is supplied via a rotary union and the effluent liquids discharged centrifugally through orifices situated in the wall of the deionization chamber at or near its outer periphery.

43. The method of claim 39 wherein the flow of two of the liquid streams are effected, regulated and determined by separate metering pumps, the flow of the third stream being effected and regulated by the combined action of the two pumps, and determined by the sum or the difference of the flow of the two metered streams.

44. The method of claim 39 wherein the feed is supplied by the centrifugal pumping action of the device and the effluents are discharged by the same centrifugal action, the flow rates being determined primarily by the size of the orifices in the effluent ports and the pressure created by the centrifugal force.

45. The method of claim 39 wherein the provision for the flow of the feed liquids and for the discharge of the effluent liquids within the cells is such as to place the cell compartments essentially in parallel; thereby an increase in the number of cells results in an increase in the volume of the feed liquid treated at the same level of purification.

46. The method of claim 39 further comprising a monitoring and control subsystem that includes sensors and devices for continuously monitoring the process, including at least one of voltage probes, conductivity electrodes, pH cells, nuclear radiation probes, and flow rate cells;

an automated means of process monitoring and control, including at least one of conductivity meters, pH meters, ammeter, voltmeter, flow rate monitors, nuclear radiation probes, a data acquisition system and a microcomputer;

a direct current power supply to provide process current and voltage;

a computer-controlled electrical switching interface for process power supply, metering pumps, process monitors and controls;

the microcomputer being programmed to perform automated monitoring, control, data logging and performance evaluation of the deionization process.

47. The method of claim 39 further comprising positioning additional deionization chambers added radially or axially with counter-current liquid flow of the concentrate and the diluent for the purpose of achieving higher degree of deionization and concentration.

48. The method of claim 39 wherein active, exposed surfaces of each of the first and the last electrodes and both surfaces of the intermediate electrodes of the electrode assembly have at least one of the following characteristics, high specific surface area, texture, and chemical composition.

49. The method of claim 39 wherein the feed is supplied by gravitational action.

50. A multi-stage deionization apparatus comprising:

two or more single-stage electrocoriolysis modules, each module containing one or a plurality of cells, the cells being arranged in an electrical series, having one electrical lead attached to the first electrode and a second lead to the last electrode, and in each single-stage module the flow of the liquid in the cells is in parallel, and each cell in each single-stage has a provision for two inlets and two outlets for the process fluids, with one inlet for the feed or the diluent situated in a rear portion of the cell near the inner periphery, a second inlet for the concentrate situated in a front portion of the cell near the outer periphery, one outlet for the diluent situated in the front portion of the cell near the inner periphery and and a second outlet for the concentrate situated in the rear portion of the cell and near the outer periphery;

the single-stage modules being attached to each other for the process liquids to flow through the assembly in series and with the diluent and the concentrate streams counter-current to each other, and the single-stage modules being connected electrically in parallel or connected separately to individual power supplies; and the single-stage modules being added in a manner where the number of cells in each module may be the same or different compared with the other modules in the device, and wherein the modules are mounted on a common hub.

51. The method of claim 50 wherein the single-stage modules are added in a radial direction in a concentric manner, such that each additional module has larger inside and outside diameters than the preceding module.

52. The method of claim 50 wherein the single-stage modules are added in an axial direction, such that the inside and the outside diameters may be the same as those of the other single-stage modules.

53. The method of claim 50 wherein the multi-stage device is comprised of single-stage modules each having a separate chamber enclosure.

54. The method of claim 50 wherein the single-stage module may share one chamber enclosure and each pair of adjacent single-stage modules may share a common end electrode.

55. The method of claim 50 wherein each common end electrode is connected to a single electrical lead serving both adjacent electrodes, thereby decreasing the number of leads and contacts by nearly one half.

56. The method of claim 50 wherein the single-stage modules are separate devices, interconnected by tubing that also may use auxiliary pumps to communicate the process fluids between the stages.

57. A method of deionization by means of a multi-stage apparatus wherein the feed liquid containing ionizable solute is pumped into a rear inlet near the inner periphery of a first module, filling the deionization apparatus, the multi-stage apparatus is rotated to create centrifugal force within greater than two times the magnitude of the force of gravity, voltage is applied to the electrical leads to cause electric current to pass in series through the cells of each module and in parallel through the multi-stage assembly of modules causing electromigration of the ions to oppositely charged electrodes, periodically reversing polarity and whereby a substantial enhancement in the degree of deionization of the solvent and in the level of concentration are achieved.

* * * * *

UNITED STATES PATENT AND TRADEMARK OFFICE
CERTIFICATE OF CORRECTION

PATENT NO. : 5,858,199
DATED : January 12, 1999
INVENTOR(S) : Joseph J. Hanak

It is certified that error appears in the above-identified patent and that said Letters Patent is hereby corrected as shown below:

In claim 51, column 37, line 31, please delete [method] and substitute --apparatus--.

In claim 52, column 38, line 1, please delete [method] and substitute --apparatus--.

In claim 53, column 38, line 5, please delete [method] and substitute --apparatus--.

In claim 54, column 38, line 8, please delete [method] and substitute --apparatus--.

In claim 55, column 38, line 12, please delete [method] and substitute --apparatus--.

UNITED STATES PATENT AND TRADEMARK OFFICE
CERTIFICATE OF CORRECTION

PATENT NO. : 5,858,199
DATED : January 12, 1999
INVENTOR(S) : Joseph J. Hanak

It is certified that error appears in the above-identified patent and that said Letters Patent is hereby corrected as shown below:

In claim 56, column 38, line 16, please delete [method] and substitute --apparatus--.

Signed and Sealed this
Twenty-fifth Day of January, 2000

Attest:

Attesting Officer

Acting Commissioner of Patents and Trademarks